(12) United States Patent
Zhu et al.

(10) Patent No.: US 9,391,759 B2
(45) Date of Patent: Jul. 12, 2016

(54) WIRELESS ACCESS NETWORK NODE HAVING AN OFF STATE

(71) Applicant: BLACKBERRY LIMITED, Waterloo (CA)

(72) Inventors: Yajun Zhu, Beijing (CN); Hua Xu, Ottawa (CA); Zhijun Cai, Herndon, VA (US); Shiwei Gao, Nepean (CA); Yufei Wu Blankenship, Kildeer, IL (US); Vahid Pourahmadi, Ottawa (CA)

(73) Assignee: BlackBerry Limited, Waterloo, Ontario (CA)

( * ) Notice: Subject to any disclaimer, the term of this patent is extended or adjusted under 35 U.S.C. 154(b) by 140 days.

(21) Appl. No.: 14/113,284

(22) PCT Filed: Aug. 19, 2013

(86) PCT No.: PCT/CN2013/081745
§ 371 (c)(1),
(2) Date: Oct. 22, 2013

(87) PCT Pub. No.: WO2015/024156
PCT Pub. Date: Feb. 26, 2015

(65) Prior Publication Data
US 2015/0049649 A1    Feb. 19, 2015

(51) Int. Cl.
*H04L 5/00*    (2006.01)
*H04W 24/02*   (2009.01)
*H04L 5/14*    (2006.01)
*H04W 48/12*   (2009.01)
*H04W 84/04*   (2009.01)

(52) U.S. Cl.
CPC ............. *H04L 5/0092* (2013.01); *H04W 24/02* (2013.01); *H04L 5/001* (2013.01); *H04L 5/14* (2013.01); *H04W 48/12* (2013.01); *H04W 84/045* (2013.01)

(58) Field of Classification Search
None
See application file for complete search history.

(56) References Cited

U.S. PATENT DOCUMENTS

| 2008/0267146 | A1  | 10/2008 | Lewis |
| 2010/0182950 | A1  | 7/2010  | Sexton |
| 2012/0002564 | A1  | 1/2012  | Sexton |
| 2012/0009926 | A1* | 1/2012  | Hevizi ............... H04W 52/0203 455/436 |
| 2012/0039195 | A1* | 2/2012  | Jung ..................... H04W 36/32 370/252 |
| 2012/0300715 | A1* | 11/2012 | Pelletier ............ H04W 56/0005 370/329 |
| 2014/0126438 | A1  | 5/2014  | Zhu |
| 2014/0128067 | A1* | 5/2014  | Lim et al. ................... 455/435.1 |

(Continued)

FOREIGN PATENT DOCUMENTS

| CN | 102625320 | 8/2012 |
| CN | 102883408 | 1/2013 |
| CN | 103052123 | 4/2013 |

OTHER PUBLICATIONS

3GPP TS 33.401 V8.4.0, Technical Specification, 3rd Generation Partnership Project; Technical Specification Group Services and System Aspects; 3GPP System Architecture Evolution (SAE): Security architecture; (Release 8), Jun. 2009 (95 pages).

(Continued)

*Primary Examiner* — Gary Mui
(74) *Attorney, Agent, or Firm* — Trop Pruner & Hu, P.C.

(57) ABSTRACT

A wireless access network node receives a configuration for a discovery signal for transmission by the wireless access network when in an off state. The wireless access network node in the off state transmits the discovery signal according to the configuration for detection by a user equipment (UE).

18 Claims, 9 Drawing Sheets

(56) References Cited

U.S. PATENT DOCUMENTS

| | | | |
|---|---|---|---|
| 2014/0128078 A1 | 5/2014 | Zhu | |
| 2014/0204771 A1 | 7/2014 | Gao | |
| 2014/0204779 A1* | 7/2014 | Zhu et al. ............... | 370/252 |
| 2014/0242963 A1* | 8/2014 | Novlan et al. ........... | 455/418 |
| 2014/0301301 A1* | 10/2014 | Cheng et al. ............ | 370/329 |
| 2014/0313963 A1* | 10/2014 | Aust et al. ............... | 370/311 |
| 2015/0023191 A1* | 1/2015 | Kim et al. ............... | 370/252 |
| 2015/0050935 A1* | 2/2015 | Maniatis ......... | H04W 76/068 |
| | | | 455/437 |

OTHER PUBLICATIONS

3GPP TR 33.821 V8.0.0, Technical Report, 3rd Generation Partnership Project; Technical Specification Group Services and System Aspects; Rationale and track of security decisions in Long Term Evolved (LTE) RAN / 3GPP System Architecture Evolution (SAE) (Release 8), Mar. 2009 (137 pages).

3GPP TS 36.300 V10.3.0, Technical Specification, 3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 10), Mar. 2011 (197 pages).

3GPP TS 36.331 V11.0.0, Technical Specification, 3rd Generation Partnership Project; Technical Specification Group Radio Access Network; Evolved Universal Terrestrial Radio Access (E-UTRA); Radio Resource Control (RRC); Protocol specification (Release 11), Jun. 2012 (302 pages).

3GPP TS 36.413 V11.1.0, Technical Specification, 3rd Generation Partnership Project; Technical Specification Group Radio Access Network; Evolved Universal Terrestrial Radio Access Network (E-UTRAN); S1 Application Protocol (S1AP) (Release 11), Sep. 2012 (262 pages).

3GPP TS 36.423 V11.2.0, Technical Specification, 3rd Generation Partnership Project; Technical Specification Group Radio Access Network; Evolved Universal Terrestrial Radio Access Network (E-UTRAN); X2 application protocol (X2AP) (Release 11), Sep. 2012 (136 pages).

3GPP TR 36.806 V9.0.0, Technical Report, 3rd Generation Partnership Project; Technical Specification Group Radio Access Network; Evolved Universal Terrestrial Radio Access (E-UTRA); Relay architectures for E-UTRA (LTE-Advanced) (Release 9), Mar. 2010 (34 pages).

3GPP TR 36.839 V11.1.0, Technical Report, 3rd Generation Partnership Project; Technical Specification Group Radio Access Network; Evolved Universal Terrestrial Radio Access (E-UTRA); Mobility enhancements in heterogeneous networks (Release 11), Dec. 2012 (53 pages).

3GPP TR 36.912 V11.0.0, Technical Report, 3rd Generation Partnership Project; Technical Specification Group Radio Access Network; Feasibility study for Further Advancements for E-UTRA (LTE-Advanced) (Release 11), Sep. 2012 (62 pages).

Han et al., Capacity Analysis of Generalized Distributed Wireless Communication System and Transmit Antenna Selection for Maximization of Average Capacity, IEEE 2004 (5 pages).

Shan-Yuan Hol, Data Fusion in a Relay Network, SIT 2008, Toronto, Canada, Jul. 6-11, 2008 (5 pages).

Vasken Genc et al., IEEE 802.16J Relay-Based Wireless Access Networks: An Overview, Oct. 2008 (8 pages).

Kerpez et al., IEEE Transactions on Vehicular Technology, vol. 45, No. 2, 265—A Radio Access System with Distributed Antennas, May 1996 (11 pages).

David Soldani et al., Radio Communications Series, Nokia Siemens Networks, Wireless Relays for Broadband Access, Mar. 2008 (9 pages).

[Draft] 3GPP TR 36.392 V0.1.0 Technical Report 3rd Generation Partnership Project; Technical Specification Group Radio Access Network; Scenarios and Requirements for Small Cell Enhancement for E-UTRA and E-UTRAN; (Release 12) (Oct. 2012) (12 pages).

3GPP TS 36.211 V11.3.0; Technical Specification; 3rd Generation Partnership Project;Technical Specification Group Radio Access Network; Evolved Universal Terrestrial Radio Access (E-UTRA); Physical Channels and Modulation (Release 11) (Jun. 2013) (108 pages).

3GPP TS 36.212 V11.3.0;Technical Specification; 3rd Generation Partnership Project; Technical Specification Group Radio Access Network; Evolved Universal Terrestrial Radio Access (E-UTRA); Multiplexing and channel coding (Release 11) (Jun. 2013) (84 pages).

3GPP TS 36.213 V11.3.0; Technical Specification; 3rd Generation Partnership Project; Technical Specification Group Radio Access Network; Evolved Universal Terrestrial Radio Access (E-UTRA); Physical layer procedures (Release 11) (Jun. 2013) (176 pages).

3GPP TS 36.331 V11.4.0; Technical Specification; 3rd Generation Partnership Project; Technical Specification Group Radio Access Network; Evolved Universal Terrestrial Radio Access (E-UTRA); Radio Resource Control (RRC); Protocol specification (Release 11) (Jun. 2013) (346 pages).

3GPP TSG RAN WG1 Meeting #73 R1-131854 Fukuoka, Japan, Agenda Item: 6.2.5.2.1 Source: Huawei, HiSilicon Title: Network adaptation for small cell operation efficiency enhancement Document for: Discussion/Decision; May 20-24, 2013 (7 pages).

3GPP TSG RAN WG1 Meeting #73 R1-132089 Fukuoka, Japan, Source: ZTE Title: Interference Analysis on Small Cell On/Off Switching Agenda Item: 6.2.5.2.1 Document for: Discussion and Decision; May 20-24, 2013 (3 pages).

3GPP TSG-RAN WG1 #73 R1-132493 Fukuoka, Japan; Agenda item: 6.2.5.2.1 Source: Qualcomm Incorporated Title: Interference avoidance and coordination; Document for: Discussion and Decision; May 20-24, 2013 (3 pages).

State Intellectual Property Office of the P.R. China, Search Report and Written Opinion for International Appl. No. PCT/CN2013/081745 dated May 19, 2014 (13 pages).

Blankenship et al., U.S. Appl. No. 13/789,931 entitled Sending Data Rate Information to a Wireless Access Network Node filed Mar. 8, 2013 (42 pages).

Blankenship et al., U.S. Appl. No. 13/837,819 entitled Establishing Multiple Connections Between a User Equipment and Wireless Access Network Nodes filed Mar. 15, 2013 (55 pages).

Gao et al., U.S. Appl. No. 13/886,627 entitled Controlling Data Offload in Response to Feedback Information filed May 3, 2013 (45 pages).

Blankenship et al., U.S. Appl. No. 13/957,620 entitled Uplink Power Sharing Control filed Aug. 2, 2013 (42 pages).

Gao et al., U.S. Appl. No. 13/960,187 entitled Communicating Radio Resource Configuration Information filed Aug. 6, 2013 (44 pages).

Cai et al., U.S. Appl. No. 13/968,642 entitled Coordinating Allocation of Resources for Use by Small Cells filed Aug. 16, 2013 (34 pages).

Zhu et al., U.S. Appl. No. 14/002,371 entitled Transmitting a Synchronization Indication filed Jun. 17, 2014 (50 pages).

Blackberry Limited, International Appl. No. PCT/CN2013/080319 entitled Communicating an Indicator Extending an Area Scope of System Information filed Jul. 29, 2013 (44 pages).

State Intellectual Property Office of the P.R. China (IPEA/CN), International Preliminary Report on Patentability for PCT/CN2013/081745 dated Dec. 4, 2015 (20 pages).

* cited by examiner

WIRELESS ACCESS NETWORK NODE HAVING AN OFF STATE

BACKGROUND

As the demand for wireless data communication using wireless user equipments (UEs) has increased, wireless access service providers are increasingly facing challenges in meeting capacity demands in regions where the density of users is relatively high. To address capacity issues, deployment of small cells has been proposed. A small cell (or multiple small cells) can operate within a coverage area of a larger cell, referred to as a macro cell. A small cell has a coverage area that is smaller than the coverage area of the macro cell.

If small cells are deployed, then communications with UEs can be offloaded from the macro cell to the small cells. In this way, data communication capacity is increased to better meet data communication demands in regions of relatively high densities of UEs.

SUMMARY

In general, according to some implementations, a wireless access network node receives a information relating to a configuration of a discovery signal for transmission by the wireless access network when in an off state. The wireless access network node in the off state transmits the discovery signal according to the configuration for detection by a user equipment (UE).

In general, according to further implementations, a wireless access network node receives information relating to a configuration of an uplink signal of a user equipment (UE) to enable the wireless access network node to monitor the uplink signal while the wireless access network node is in an off state.

In general, according to other implementations, a first wireless access network node sends, to a user equipment (UE), a Radio Resource Control (RRC) message containing timing information pertaining to a discovery signal to be transmitted by a second wireless access network node in an off state.

In general, according to additional implementations, a first wireless access network node sends, to a second wireless access network node, information relating to a configuration of an uplink signal of a user equipment (UE) to be measured by the second wireless access network node in an off state.

Other or alternative features will become apparent from the following description, from the drawings, and from the claims.

BRIEF DESCRIPTION OF THE DRAWINGS

Some embodiments are described with respect to the following figures.

DETAILED DESCRIPTION

Figure 1:
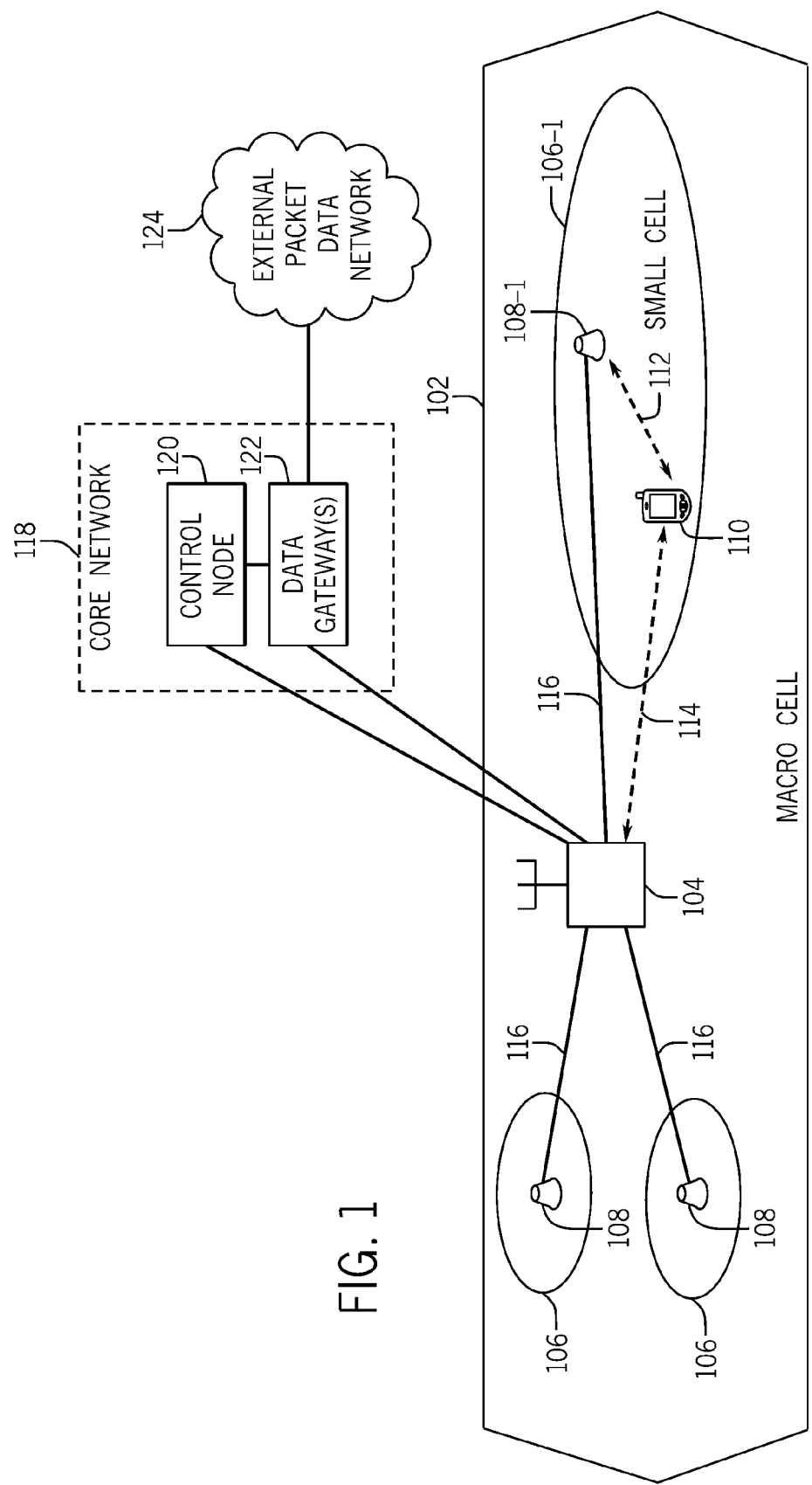
FIG. 1 is a schematic diagram of an example network arrangement that includes macro cells and small cells, in accordance with some implementations.

Small cells are provided by small cell wireless access network nodes. A wireless access network node is responsible for performing wireless transmissions and receptions with user equipments (UEs) within a coverage area of the cell provided by the wireless access network node. A coverage area can refer to a region where mobile services can be provided by a network node to a target level. Examples of UEs can include any of the following: smart phones, personal digital assistants, notebook computers, tablet computers, or any other devices that are capable of wireless communications.

A wireless access network node for a small cell can be considered as a lower power wireless access network node. A lower power wireless access network node transmits signals at a power that is generally lower than a power of a macro wireless access network node. A macro cell provided by a macro wireless access network node has a coverage area that is generally larger than the coverage area of a small cell provided by a small cell wireless access network node.

Examples of small cell wireless access network nodes include pico wireless access network nodes, femto wireless access network nodes, relay nodes, and so forth. A pico cell provided by a pico wireless access network node refers to a cell that has a relatively small coverage area, such as within a building, a train station, an airport, an aircraft, or other small area. A femto cell provided by a femto wireless access network node is a cell that is designed for use in a home or small business. A femto cell is associated with a closed subscriber group (CSG), which specifies that only users within a specified group are allowed to access the femto cell. A relay node is used for relaying data from one wireless entity to another wireless entity. There can be other examples of small cell wireless access network nodes.

An issue associated with providing a relatively large density of small cells is that increased interference can occur. For example, communications in one cell (referred to as an aggressor cell) can interfere with communications in another cell (referred to as a victim cell). In some cases, small cells can also overlap with each other in coverage, which can lead to increased interference.

To reduce interference, a small cell wireless access network node can be turned off. Since the small cell wireless access network node that is turned off does not transmit signals or only transmit the signals with reduced density, the small cell wireless access network node that is turned off would cause less or no interference over other nearby small cells. Additionally, turning off a small cell wireless access network node can save energy.

In some cases, small cell wireless access network nodes can be turned off in specific time intervals, such as during time intervals of expected low usage (e.g. during the night). The small cell wireless access network nodes can be turned back on during time intervals of expected high usage (e.g. during the daytime hours).

In other cases, a small cell wireless access network node can be turned on and off more dynamically. For example, a small cell wireless access network node can be turned on and off more frequently based on detected traffic or interference conditions.

A small cell wireless access network node that is in the off state does not transmit and receive a majority of signals (including signals for carrying data and control information) that the small cell wireless access network node would transmit and receive when it is in the on state. As a result, a small cell wireless access network node that is in the off state is not able to serve UEs within the coverage area of the small cell wireless access network node. Note that a small cell wireless access network node in an off state may still be able to communicate with a core network node or another wireless access network node.

However, as discussed further below, a small cell wireless access network node in the off state may still remain capable of transmitting or receiving (or both) selected signal(s), to use for discovery purposes or other purposes.

Note that in some examples, a small cell wireless access network node can operate using a number of component carriers, which allows a UE to communicate with the wireless access network node using one or multiple component carriers (at respective different frequencies). The component carriers can be aggregated together to provide carrier aggregation service for the UE, in which the UE can establish multiple concurrent wireless connections with the wireless access network node on the respective component carriers.

Each of the component carriers can provide a respective cell. In examples where a wireless access network node provides multiple component carriers (multiple cells), turning on or off the wireless access network node can refer to turning on or off of one cell (or multiple cells) provided by the respective component carriers of the wireless access network node.

When a small cell wireless access network node is turned off, several issues may arise. First, a UE that is within a coverage area of a wireless access network node that is in an off state may not be able to determine whether or not the UE has entered such coverage area. Second, a wireless access network node that is in an off state may not be able to determine that a UE has entered the wireless access network node's coverage area.

Moreover, transitioning a wireless access network node from an on state to an off state may affect one or more UEs within the coverage area of the small cell wireless access network node. In addition, further issues may relate to the manner in which a wireless access network node is to be awakened from an off state to an on state, or to the manner of dynamically controlling the on/off state of a wireless access network node.

In the ensuing discussion, reference is made to techniques or mechanisms that are applied with respect to small cell wireless access network nodes that can be turned on and off. However, in alternative implementations, similar techniques or mechanisms can be applied to other types of wireless access network nodes, including macro wireless access network nodes.

Also, reference is made to mobile communications networks that operate according to the Long-Term Evolution (LTE) standards as provided by the Third Generation Partnership Project (3GPP). The LTE standards are also referred to as the Evolved Universal Terrestrial Radio Access (E-UTRA) standards. Although reference is made to E-UTRA in the ensuing discussion, it is noted that techniques or mechanisms according to some implementations can be applied to other wireless access technologies.

In an E-UTRA network, a wireless access network node can be implemented as an enhanced Node B (eNB), which includes functionalities of a base station and base station controller. Thus, in an E-UTRA network, a macro wireless access network node is referred to as a macro eNB. In an E-UTRA network, small cell wireless access network nodes can be referred to as small cell eNBs.

FIG. 1 illustrates an example arrangement that includes network nodes that are part of a mobile communications network that supports wireless communications with UEs. A macro cell 102 corresponds to a coverage area provided by a macro eNB 104.

In addition, a number of small cells 106 are depicted as being within the coverage area of the macro cell 102. Each small cell 106 corresponds to a coverage area provided by a respective small cell eNB 108. One of the small cells is labeled 106-1, and the corresponding small cell eNB is labeled 108-1.

A wireless UE 110 within the coverage area of the small cell 106-1 is able to wirelessly communicate with the small cell eNB 108-1. The UE 110 is also able to wirelessly communicate with the macro eNB 104. Although just one UE 110 is depicted in FIG. 1, it is noted that multiple UEs may be present in coverage areas of each of the small cells 106 as well as within the coverage area of the macro cell 102.

A first wireless connection 112 can be established between the UE 110 and the small cell eNB 108-1. In addition, a second wireless connection 114 can be established between the UE 110 and the macro eNB 104. In such an arrangement, the UE 110 is considered to have established dual concurrent wireless connections with the macro eNB 104 and the small cell eNB 108-1. In other examples, the UE 110 can establish multiple concurrent wireless connections with the macro eNB 104 and with multiple small cell eNBs 108.

FIG. 1 also shows a backhaul link 116 between the macro eNB 104 and each of the small cell eNBs 108. The backhaul link 116 can represent a logical communication link between two nodes; the backhaul link 116 can either be a direct point-to-point link or can be routed through another communication network or node. In some examples, the backhaul link 116 is a wired link. In other examples, the backhaul link 116 is a wireless link. Although not shown, backhaul links may also be provided between small cell eNBs 108.

In some implementations, the macro cell 102 (and more specifically the macro eNB 104) can provide all of the control plane functions, while a small cell 106 (more specifically the corresponding small cell eNB 108) provides at least a portion of the user plane functions for a dual-connection capable UE (a UE that is capable of concurrently connecting to both macro and small cells). Note that the macro eNB 104 can also provide user plane functions for the dual-connection capable UE.

Control plane functions involve exchanging certain control signaling between the macro eNB 104 and the UE 110 to perform specified control tasks, such as any or some combination of the following: network attachment of a UE, authentication of the UE, setting up radio bearers for the UE, mobility management to manage mobility of the UE (mobility management includes at least determining which infrastructure network nodes will create, maintain or drop uplink and downlink connections carrying control or user plane information as a UE moves about in a geographic area), performance of a handover decision based on neighbor cell measurements sent by the UE, transmission of a paging message to the UE, broadcasting of system information, control of UE measurement reporting, and so forth. Although examples of control tasks and control messages in a control plane are listed above, it is noted that in other examples, other types of control messages and control tasks can be provided. More generally, the control plane can perform call control and connection control functions, and can provide messaging for setting up calls or connections, supervising calls or connections, and releasing calls or connections.

User plane functions relate to communicating traffic data (e.g. voice data, user data, application data, etc.) between the UE and a wireless access network node. User plane functions can also include exchanging control messages between a wireless access network node and a UE associated with communicating the traffic data, flow control, error recovery, and so forth.

A small cell connection can be added to or removed from a UE under the control of the macro eNB 104. In some implementations, the action of adding or removing a small cell for a UE can be transparent to a core network 118 of the mobile communications network. The core network 118 includes a control node 120 and one or more data gateways 122. The data gateway(s) 122 can be coupled to an external packet data network (PDN) 124, such as the Internet, a local area network (LAN), a wide area network (WAN), and so forth.

In an E-UTRA network, the control node 120 in the core network 118 can be implemented as a mobility management entity (MME). An MME is a control node for performing various control tasks associated with an E-UTRA network. For example, the MME can perform idle mode UE tracking and paging, bearer activation and deactivation, selection of a serving gateway (discussed further below) when the UE initially attaches to the E-UTRA network, handover of the UE between macro eNBs, authentication of a user, generation and allocation of a temporary identity to a UE, and so forth. In other examples, the MME can perform other or alternative tasks.

In an E-UTRA network, the data gateway(s) 122 of the core network 118 can include a serving gateway (SGW) and a packet data network gateway (PDN-GW). The SGW routes and forwards traffic data packets of a UE served by the SGW. The SGW can also act as a mobility anchor for the user plane during handover procedures. The SGW provides connectivity between the UE and the PDN 124. The PDN-GW is the entry and egress point for data communicated between a UE in the E-UTRA network and a network element coupled to the PDN 124. There can be multiple PDNs and corresponding PDN-GWs. Moreover, there can be multiple MMEs and SGWs.

Note that a legacy UE (a UE that is not capable of establishing multiple concurrent wireless connections with both a macro cell and one or more small cells) can connect to either a macro cell or a small cell using traditional wireless connection techniques.

When a UE moves under the coverage of a small cell 106, the macro eNB 104 may decide to offload some of the user plane traffic to the small cell. This offload is referred to as a data offload. When a data offload has been performed from the macro cell 104 to the small cell 106, then a UE that has a dual connection can transmit or receive data to and from the corresponding small cell wireless access network node 108. Additionally, the UE 110 can also communicate user plane traffic with the macro eNB 104. Although reference is made to data offload to one small cell, it is noted that in other examples, the macro cell 104 can perform data offload for the UE 110 to multiple small cells.

Discovery of a Small Cell eNB in an Off State

When a small cell eNB is in an off state, and a UE moves into the coverage area of the small cell eNB, it may be beneficial to activate the small cell eNB from the off state to the on state, particularly if the UE has a relatively large amount of data traffic to communicate. However, since a small cell eNB has turned off its downlink transmissions in the off state, a UE may not be able to determine that the UE is nearby a small cell eNB that is in an off state, and thus, would not a be able to establish a connection with the small cell eNB that is in the off state.

A small cell eNB in an off state is also referred to as a "sleeping small cell eNB."

In accordance with some implementations, the sleeping small cell eNB can continue to send a discovery signal even though the small cell eNB is in the off state. The discovery signal can be an existing signal with enhancements or modifications or a new signal. A new signal refers to a signal that is not provided by current standards, but which may (or may not) be defined by future standards. An existing signal refers to a signal provided by current standards.

Figure 2:
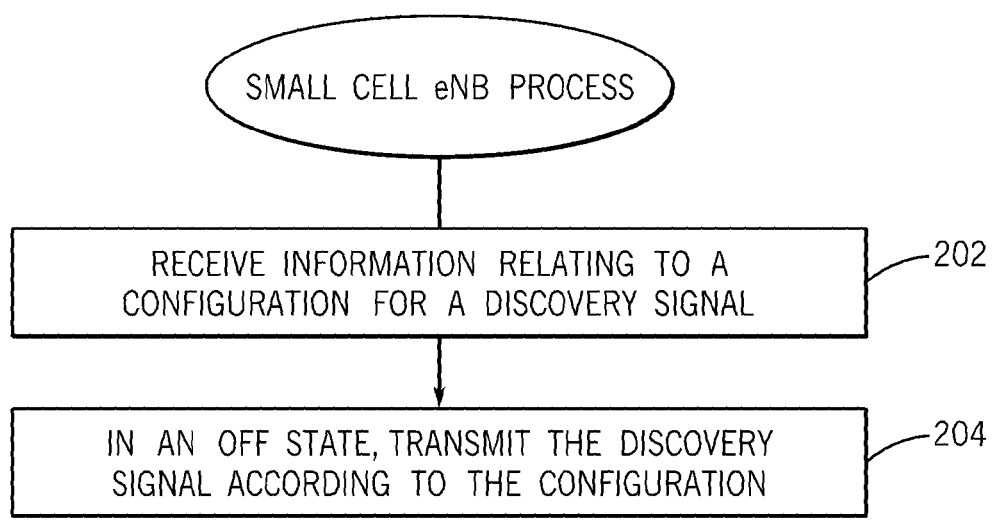
FIG. 2 is a flow diagram of a process for transmitting a discovery signal by a sleeping small cell wireless access network node, according to some implementations.

FIG. 2 is a flow diagram of a process of a small cell eNB according to some implementations. The small cell eNB receives (at 202) information relating to a configuration for the discovery signal. Once the small cell eNB enters into an off state, the small cell eNB would deactivate downlink transmissions that the small cell eNB would normally send when the small cell eNB is in the on state. However, in the off state, the small cell eNB can transmit (at 204) the discovery signal according to the configuration, where the transmitted discovery signal is for detection by a UE to allow the UE to detect that the UE is nearby the small cell eNB that is in the off state (e.g. within the coverage area of the small cell eNB). Thus, once a UE enters the coverage area of a sleeping small cell eNB, even though the UE is not served by this small cell eNB, the UE can still detect the discovery signal transmitted by the sleeping small cell eNB.

The configuration received at 202 can specify at least one characteristic of the discovery signal. For example, the characteristic can include the subframes and the time and frequency resource within each of the subframes used for transmitting the discovery signal. The transmission may occur periodically. In this case, a timing of the discovery signal, such as the periodicity of the discovery signal, or an offset at which the discovery signal is located. The periodicity of the discovery signal specifies a time interval between periodic transmissions of the discovery signal. The offset can indicate the starting point of the discovery signal. In implementations where data and control information are carried in frames (also referred to as radio frames or system frames), a subframe can be identified by a system frame index and a subframe index with the system frame. For example, a subframe can be identified as $(n_f, i)$, where $n_f$ is the system frame index and i is the subframe index within the system frame. Let $N_{sf}$ be the number of subframes in a system frame, then for a discovery signal configured with periodicity $M_p$ and subframe offset $M_{offset}$, the discovery signal would be transmitted on subframes $(n_f, i)$ satisfying $(N_{sf} \cdot n_f + i - M_{offset}) \mod(M_P) = 0$, where mod is a modulo function.

Figure 3:
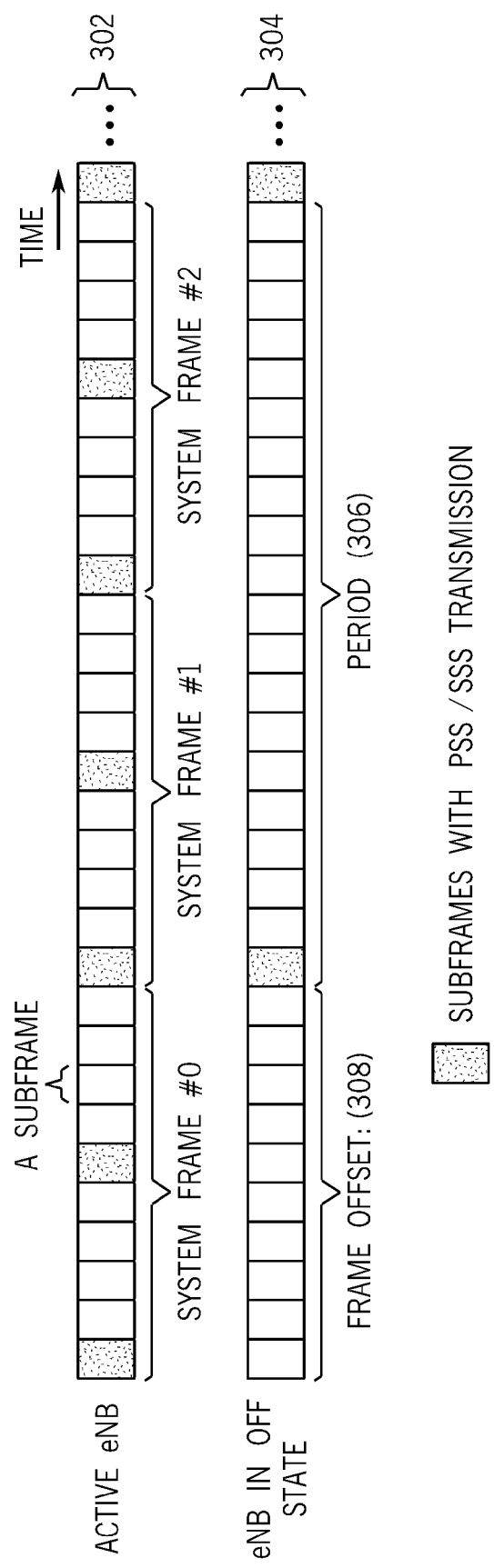
FIG. 3 is a schematic diagram of transmissions by an active wireless access network node and a sleeping wireless access network node, according to some implementations.

A sleeping small cell eNB can still periodically transmit a discovery signal according to a specified periodicity (as specified by the configuration). FIG. 3 illustrates example downlink transmissions of a small cell eNB. First transmissions (302) are by the small cell eNB when the small cell is active (in the on state). Second transmissions (304) are by the small cell eNB in the off state.

The transmissions 302 and 304 are made in system frames (frame #0, frame #1, and frame #2 depicted in FIG. 3). Each system frame includes a number (e.g. 10) of subframes (each subframe is represented as a box in FIG. 3). A subframe has a specified time duration over which data or control information, or both, can be carried. Each box filled with a hash pattern represents a subframe that carries at least one synchronization signal. More specifically, in some examples, the hashed boxes represent subframes that carry a primary synchronization signal (PSS) and a secondary synchronization signal (SSS), as defined by the 3GPP standards.

In the first transmissions (302) by the active small cell eNB, the synchronization signals are transmitted at a first periodicity. However, in the second transmissions (304) by the small cell eNB in the off state, the synchronization signals are transmitted at a second, larger periodicity. A larger periodicity refers to a longer period (or longer time duration between transmissions of the synchronization signals).

In the FIG. 3 example, it is assumed that the PSS or SSS, or both, is (or are) used as a discovery signal transmitted by the small cell eNB in the off state. In the second transmissions (304), the configuration (received at 202 in FIG. 2) can specify the periodicity (306) of transmission of the discovery signal, as well as the frame offset (308) that indicates the starting point of the discovery signal. In the depicted example, a PSS or SSS is an example of an existing signal that can be used as a discovery signal.

Note that when used as a discovery signal transmitted by a sleeping small cell eNB, the PSS or SSS is transmitted at a larger periodicity than the periodicity of the PSS or SSS sent by an active eNB. In the example of FIG. 3, the active small cell eNB transmits a PSS/SSS every five subframes, while the sleeping small cell eNB transmits a PSS/SSS every 20 subframes.

Another example of an existing signal that can be used as a discovery signal that can be transmitted by a sleeping small cell eNB is a cell-specific reference signal (CRS). Normally, a CRS transmitted by an eNB can be used for estimating a condition of a downlink channel. A CRS used as a discovery signal can be transmitted by a sleeping small cell eNB with a larger periodicity than a CRS transmitted by an active small cell eNB.

It is noted that the remaining subframes (those represented by the blank boxes in FIG. 3) in the second transmissions (304) are kept silent—in other words, these subframes do not include any signals. (Note that depending upon a subframe configuration, some of the subframes may have been assigned to carry uplink information from a UE to the small cell eNB in a time division duplex (TDD) system).

In some implementations, the UE can report information pertaining to the detected discovery signal to another network node (referred to as a "coordinating network node"), such as the macro eNB 104 (FIG. 1), or another (active) small cell eNB, or a network node in the core network 118 (FIG. 1). The reported information can include any one or more of the following: an identifier of the received discovery signal, a cell identifier (to identify a cell), a received signal strength of the small cell eNB that is in the off state, and other cell-specific information.

The coordinating network node can collect the reported information from the UE, as well as from other UEs that have detected the discovery signals of the sleeping small cell eNB. The coordinating network node can decide, based on the reported information from the UEs, whether the sleeping small cell eNB should be turned on to serve the UE. If so, the coordinating network node can signal the decision to the sleeping small cell eNB, and possibly to the UE. A command to awaken a sleeping small cell eNB can be sent on a backhaul link (e.g. 116 in FIG. 1), over the air, or over a link between the core network 118 and the sleeping small cell eNB.

In some examples, a command can also be sent to the UE to perform signal strength measurements for the small cell eNB that has been activated from the off state to the on state. Alternatively, the UE does not have to be notified that the formerly sleeping small cell eNB has been activated; rather, the UE can autonomously check to determine if the sleeping small cell eNB has awakened to the on state. Once the small cell eNB is turned on, the UE can measure the signal strength of the newly activated small cell eNB. If the signal strength of this newly activated small cell eNB is stronger than the detected signal strength of the small cell eNB that currently serves the UE (or some other handover criterion is satisfied), then a handover operation can be triggered to hand over the UE from the serving small cell eNB to the newly activated small cell eNB.

To facilitate the transmission of discovery signals, the sleeping small cell eNB can maintain synchronization with one or more other network nodes, such as the macro eNB 102 and other small cell eNBs. Synchronization can be maintained between eNBs over backhaul links or over an air interface In some examples, the coordinating network node, such as the macro eNB 104 or another node, can provide assistance to help a sleeping small cell eNB in setting an effective periodicity of transmissions of a discovery signal. For example, the coordinating network node can dynamically modify the periodicity, such as based on a traffic load observed by the coordinating network node. If there is a higher traffic load detected by the coordinating network node, the coordinating network node can notify a sleeping small cell eNB (or multiple small cell eNBs) to transmit a discovery signal at a smaller periodicity (i.e. more frequently). More frequent transmissions of the discovery signal by a sleeping small cell eNB increases the possibility of the sleeping small cell eNB being detected by UEs.

To facilitate detection of a discovery signal transmitted by a sleeping small cell eNB, a macro eNB or another active eNB can send, to a UE, configuration information pertaining to the discovery signal. The configuration information can include at least one of timing information, such as the periodicity and/or time offset (e.g. system frame number), a time and/or frequency resource within a subframe, a signal waveform information of the discovery signal, or other information. The configuration information can also identify another characteristic of the discovery signal.

The signal waveform information can refer to a cell-specific signal transmitted by the sleeping small cell eNB. The cell-specific signal can be a CRS transmitted by the sleeping small cell eNB, or cell-specific synchronization signal (e.g. PSS or SSS) transmitted by the sleeping small cell eNB.

The configuration relating to the time and/or frequency resource can specify a subset of a time and/or frequency resource configured for a CRS transmitted by a small cell eNB. Alternatively, the time and/or frequency resource can be different from a time and/or frequency resource configured for a CRS transmitted by the small cell eNB.

The configuration information can be signaled to the UE using higher layer messaging, such as a Radio Resource Control (RRC) message, which can include a dedicated RRC message (that is sent to a particular UE) or a broadcast RRC message (that is broadcast to multiple UEs).

In implementations where synchronization is maintained between the sleeping small cell eNB and other network nodes, a UE can use the configuration information to obtain the approximate timing of the subframes in which the discovery signal from a sleeping small cell eNB is transmitted. The UE can perform detection of the discovery signal in those subframes.

An example of a modified version of an existing RRC message is provided below. More specifically, the following depicts a modified version of a RadioResourceConfigDedicated information element as described in 3GPP TS 36.331. In the example below, the underlined text indicates new information elements that are currently not specified in the 3GPP standards. A new information element refers to an information element that is not provided by current standards, but which may (or may not) be defined by future standards. An existing information element refers to an information element provided by current standards.

```
-- ASN1START
RadioResourceConfigDedicated ::=        SEQUENCE {
    srb-ToAddModList                    SRB-ToAddModList        OPTIONAL,       -- Cond HO-Conn
    drb-ToAddModList                    DRB-ToAddModList        OPTIONAL,       -- Cond HO-toEUTRA
    drb-ToReleaseList                   DRB-ToReleaseList       OPTIONAL,       -- Need ON
    mac-MainConfig                      CHOICE {
        explicitValue                       MAC-MainConfig,
        defaultValue                        NULL
    }       OPTIONAL,                                                           -- Cond HO-toEUTRA2
    sps-Config                          SPS-Config              OPTIONAL,       -- Need ON
    physicalConfigDedicated             PhysicalConfigDedicated OPTIONAL,       -- Need ON
    ...,
    [[  rlf-TimersAndConstants-r9       RLF-TimersAndConstants-r9       OPTIONAL    -- Need ON
    ]],
    [[  measSubframePatternPCell-r10    MeasSubframePatternPCell-r10    OPTIONAL    -- Need ON
    ]],
    [[  neighCellsCRS-Info-r11          NeighCellsCRS-Info-r11          OPTIONAL    -- Need ON
    ]]
    [[  NeighSmallCellsDS-Info-r12      NeighSmallCellsDS-Info-r12      OPTIONAL    -- Need ON
    ]]
}
RadioResourceConfigDedicatedSCell-r10 ::=   SEQUENCE {
    -- UE specific configuration extensions applicable for an SCell
    physicalConfigDedicatedSCell-r10            PhysicalConfigDedicatedSCell-r10    OPTIONAL,   -- Need ON
    ...,
    [[  mac-MainConfigSCell-r11         MAC-MainConfigSCell-r11         OPTIONAL    -- Cond SCellAdd
    ]]
}
SRB-ToAddModList ::=                SEQUENCE (SIZE (1..2)) OF SRB-ToAddMod
SRB-ToAddMod ::=    SEQUENCE {
    srb-Identity                        INTEGER (1..2),
    rlc-Config                          CHOICE {
        explicitValue                       RLC-Config,
        defaultValue                        NULL
    }       OPTIONAL,                                                           -- Cond Setup
    logicalChannelConfig                CHOICE {
        explicitValue                       LogicalChannelConfig,
        defaultValue                        NULL
    }       OPTIONAL,                                                           -- Cond Setup
    ...
}
DRB-ToAddModList ::=                SEQUENCE (SIZE ( 1..maxDRB)) OF DRB-ToAddMod
DRB-ToAddMod ::=    SEQUENCE {
    eps-BearerIdentity                  INTEGER (0..15)         OPTIONAL,       -- Cond DRB-Setup
    drb-Identity                        DRB-Identity,
    pdcp-Config                         PDCP-Config             OPTIONAL,       -- Cond PDCP
    rlc-Config                          RLC-Config              OPTIONAL,       -- Cond Setup
    logicalChannelIdentity              INTEGER (3..10)         OPTIONAL,       -- Cond DRB-Setup
    logicalChannelConfig                LogicalChannelConfig    OPTIONAL,       -- Cond Setup
    ...
}
DRB-ToReleaseList ::=               SEQUENCE (SIZE (1..maxDRB)) OF DRB-Identity
MeasSubframePatternPCell-r10 ::=    CHOICE {
    release                             NULL,
    setup                               MeasSubframePattern-r10
}
NeighCellsCRS-Info-r11 ::=      CHOICE {
    release                             NULL,
    setup                               CRS-AssistanceInfoList-r11
}
CRS-AssistanceInfoList-r11 ::=      SEQUENCE (SIZE (1..maxCellReport)) OF CRS-AssistanceInfo-r11
CRS-AssistanceInfo-r11 ::= SEQUENCE {
    physCellId-r11                      PhysCellId,
    antennaPortsCount-r11               ENUMERATED {an1, an2 , an4 , spare1},
    mbsfn-SubframeConfigList-r11        MBSFN-SubframeConfigList,
```

```
...
}
NeighSmallCellsDS-Info-r12 ::=      CHOICE {
    release                         NULL,
    setup                           DS-ConfigurationInfo-r12
}
DS-ConfigurationInfo-r12 ::=SEQUENCE {
    DS-TransmissionInterval-r12     ENUMERATED{
                                        sf20, sf40, sf80, sf160,sf320
                                        sf640},
    DS-offset-r12                   ENUMERATED{
                                        10, 20, 40, 60, 80, 160, 320,480,640},
    ...
}
-- ASN1STOP
```

In the foregoing example, the DS-TransmissionInterval information element specifies a periodicity of the discovery signal, referred to as NeighSmallCellsDS-Info. Also, the DS-offset information element specifies the time offset of the discovery signal.

The foregoing describes implementations in which existing signals are used as discovery signals. In alternative implementations, new discovery signals can be used instead of existing signals.

A new discovery signal can have a relatively longer transmission periodicity, to avoid transmitting the discovery signal too frequently. In some examples, the new discovery signal can be derived from a specified sequence (also referred to as a "discovery sequence"). For example, different small cell eNBs can transmit discovery signals with different discovery sequences. The discovery sequences that are transmitted by neighboring small cell eNBs can be orthogonal sequences or quasi-orthogonal sequences.

In some examples, a sequence used for a discovery signal can be dependent upon a cell identifier that identifies the cell of the respective small cell eNB. In a more specific example, the cell identifier can be used as an initial seed in generating the discovery sequence. In this way, different discovery sequences can be mapped to different cell identifiers.

A UE can be notified of a pool of discovery sequences and their relations to cell identifiers in higher layer messaging, such as RRC messaging. In this way, based on a detected discovery sequence, the UE can determine the respective cell identifier associated with the sleeping small cell eNB that transmitted the discovery sequence detected by the UE.

In some implementations, a discovery sequence can have a longer length than a sequence used for a synchronization signal, such as PSS or SSS.

In further implementations, the duplex mode of a small cell eNB can be indicated by a discovery sequence or by a resource for carrying a discovery signal, or both. For example, a first pool of discovery sequences can be used for small cell eNBs that operate according to a frequency division duplex (FDD) mode, and a second pool of discovery sequences can be used for small cell eNBs that operate according to a time division duplex (TDD) mode. In FDD mode, uplink and downlink transmissions are separated in the frequency domain, by transmitting uplink data using a first carrier frequency, and transmitting downlink data using a second carrier frequency. In TDD mode, both uplink and downlink transmissions occur on the same carrier frequency; however, uplink and downlink transmissions are separated in the time domain, by sending uplink and downlink transmissions in different time periods. If a UE detects a discovery sequence from the first pool, then the UE can determine that the small cell eNB that transmitted the discovery sequence operates in FDD mode. Similarly, if a UE detects a discovery sequence from the second pool, then the UE can determine that the small cell eNB that transmitted the discovery sequence operates in TDD mode.

In alternative implementations, the discovery signal transmissions can be carried in multiple symbols (e.g. orthogonal frequency-division multiplexing or OFDM symbols). A gap between symbols carrying discovery signal transmissions can be used to indicate a duplex mode; e.g. a first gap between symbols indicates FDD mode, while a second, different gap between symbols indicates TDD mode.

Discovery signals can be transmitted in one or more symbols within a given subframe. In other examples, discovery signal transmissions can span more than one subframe. The subframes carrying discovery signals can be continuous or discontinuous in the time domain.

Figure 4:
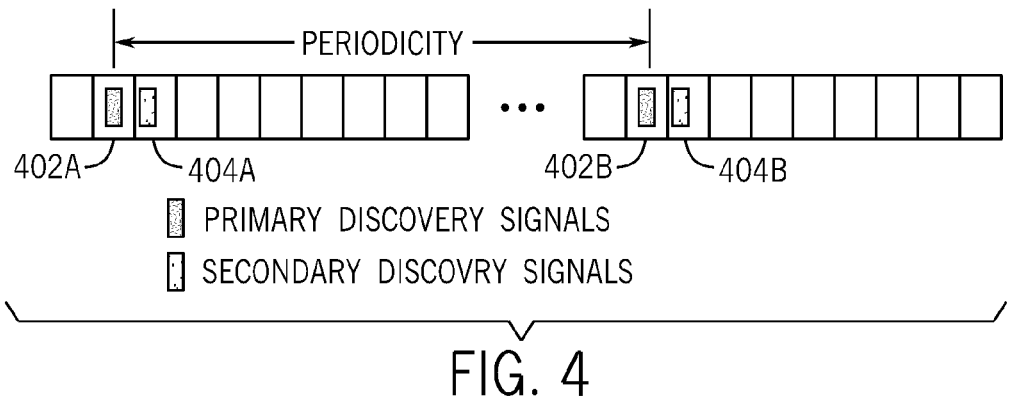
FIG. 4 is a schematic diagram of transmissions of primary and second discovery signals, according to further implementations.

FIG. 4 depicts an example in which the second subframe (402A, 402B) of each system frame is used to carry a primary discovery signal, while the third subframe (404A, 404B) of each system frame is used to carry a secondary discovery signal.

The use of primary and secondary discovery signals as depicted in FIG. 4 is analogous to use of PSS and SSS (for synchronization purposes when a small cell eNB is in an on state). A UE can first attempt to detect a primary discovery signal transmitted by a sleeping small cell eNB. Certain information relating to the corresponding cell can be derived from the primary discovery signal. Once the primary discovery signal is detected, the UE can attempt to detect a secondary discovery signal that is transmitted by the sleeping small cell eNB. The UE can derive further information about the corresponding cell from the secondary discovery signal.

Various different options can be implemented for configurations used for discovery signals.

In Option 1, the configuration of the discovery signal can be the same for all small cell eNBs. For example, the discovery signals transmitted by the different eNBs can have the same periodicity, time resource, and frequency resource. A time resource can refer to a subframe (within a system frame) and/or OFDM symbol(s) within a subframe that is (are) used to carry a discovery signal. A frequency resource can refer to the sub-carriers or Resource Blocks (RBs) used to carry a discovery signal.

Figure 5:
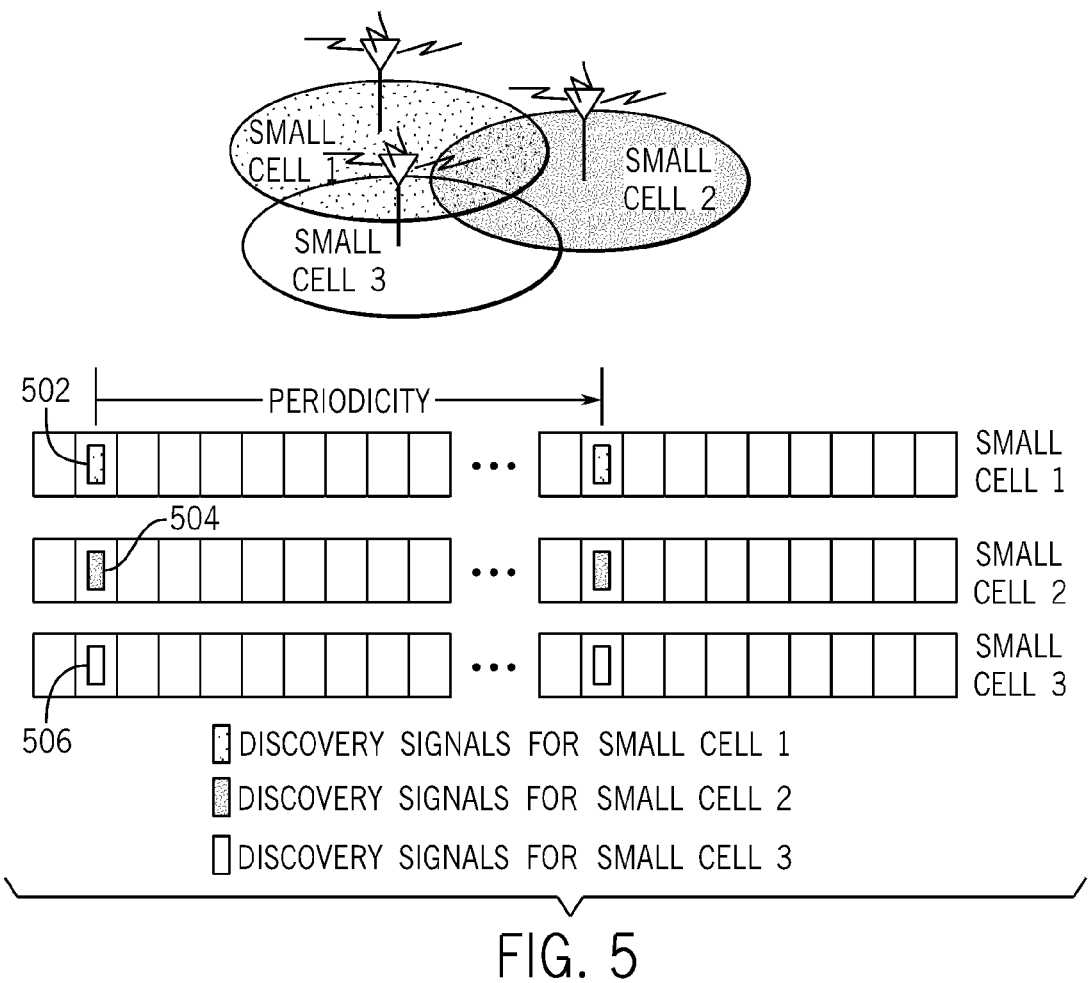
FIGS. 5-7 are schematic diagrams of transmissions of discovery signals in different small cells, according to various implementations.

FIG. 5 depicts an example that has three small cells. As shown in FIG. 5, the discovery signals 502, 504, and 506 transmitted in each of the three small cells are carried in the same subframe (e.g. the second subframe of a system frame in the FIG. 5 example). Also, the discovery signals transmitted in the three small cells have the same periodicity, and are carried on the same frequency resource (frequency is represented along the vertical axis in FIG. 5).

According to Option 1, as depicted in FIG. 5, sleeping small cell eNBs transmit respective discovery signals simultaneously on the same time and frequency resources. To allow for successful detection of the discovery signals transmitted by different small cell eNBs, the discovery sequences used for the discovery signals are orthogonal to each other. A UE can distinguish the cell identifier of a small cell based on the detected discovery sequence.

Figure 6:
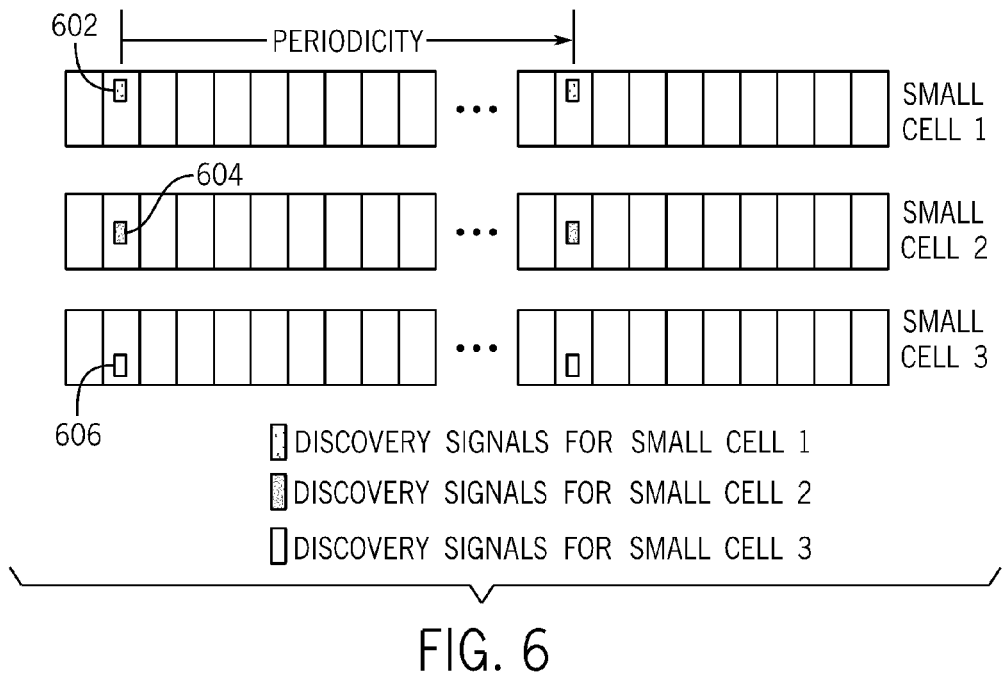

Alternatively, in Option 2, as shown in FIG. 6, the periodicity and time resource (subframe) for carrying discovery signals can be the same for all small cells. However, the frequency resource used to carry discovery signals can be different across different small cells, so that a UE can distinguish discovery signals of different small cells based on the detected discovery sequences or the frequency resource used, or both. FIG. 6 shows that the discovery sequence 602, discovery sequence 604, and discovery sequence 606 for the three small cells are carried on different frequency resources (e.g. different sub-carriers or RBs of different frequencies). The different frequency resources are indicated by different relative positions of the sequences 602, 604, and 606 along the vertical axis within each corresponding subframe.

Figure 7:
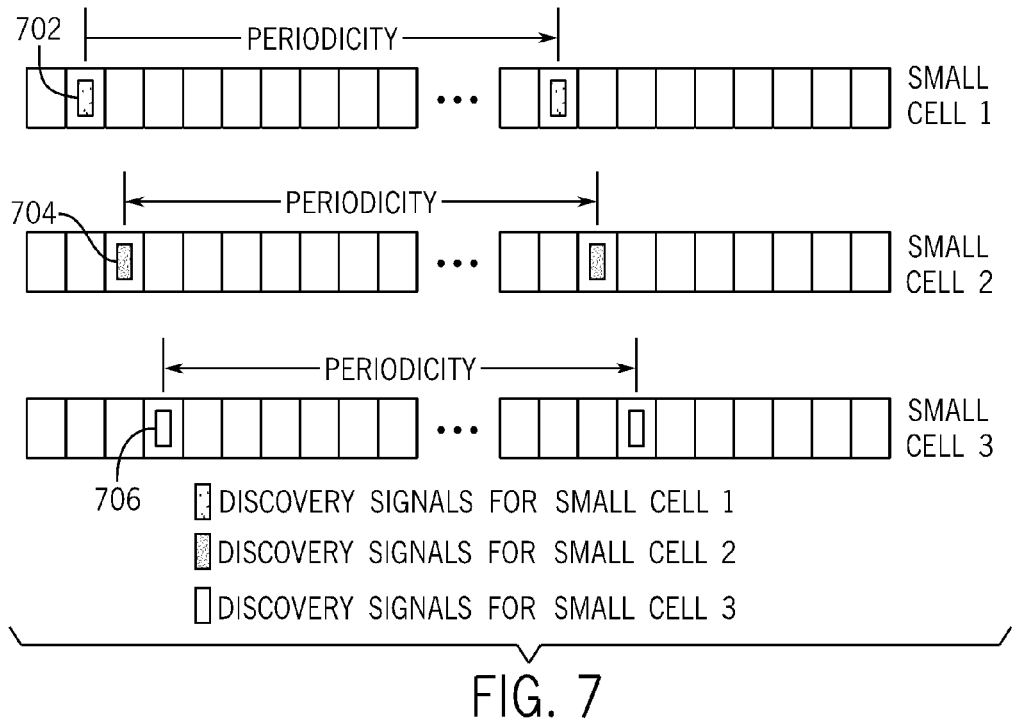

As another alternative, in Option 3, as shown in FIG. 7, the periodicity and frequency resource to carry discovery signals 702, 704, and 706 can be the same across multiple small cells. However, the time resource used to carry discovery signals can be different for different small cells. For example, as shown in FIG. 7, the discovery sequence for small cell 1 is in the second subframe of a system frame, the discovery sequence for small cell 2 is in the third subframe of a system frame, and the discovery sequence for small cell 3 is in the fourth subframe of a system frame. With Option 3, a UE can distinguish discovery signals from different small cells based on the detected discovery sequences or the time resource used, or both.

Note that a time resource for carrying a discovery signal can include a subframe, or an OFDM symbol, or both. For example, discovery signals of different small cells can be distinguished by different OFDM symbols that are used to carry the discovery signals, or by different subframe indices of subframes used to carry the discovery signals.

In further alternative implementations, in Option 4, the configurations of discovery signals for different small cells can be based on respective unique combinations of periodicity, frequency, sequence, and time. For example, the configuration of a discovery signal for a first small cell can be based on a first combination of periodicity, frequency, sequence, and time, while the configuration of a discovery signal for a second small cell can be based on a second, different combination of periodicity, frequency, sequence, and time, The configuration for a discovery signal of a given small cell can be sent to a UE by the macro eNB 104 or another active small cell eNB. After receiving the configuration, the UE can perform detection of a sleeping small cell eNB based on detection of the discovery signal according to the configuration.

In some examples, the configuration containing the periodicity, time resource, frequency resource, and sequence can be included in a dedicated RRC message sent to the UE. In other examples, the configuration can be sent to the UE in a broadcast RRC message, such as in a System Information Block (SIB). For example, the configuration for the discovery signal can be carried in a new information element of SIB type 4 or 5, or in a new SIB.

An example of a modified RadioResourceConfigDedicated information element that can be carried in an RRC message is provided below (underlined text indicates new information elements):

```
-- ASN1START
RadioResourceConfigDedicated ::=        SEQUENCE {
    srb-ToAddModList                    SRB-ToAddModList       OPTIONAL,    -- Cond HO-Conn
    drb-ToAddModList                    DRB-ToAddModList       OPTIONAL,    -- Cond HO-
toEUTRA
    drb-ToReleaseList                   DRB-ToReleaseList      OPTIONAL,    -- Need ON
    mac-MainConfig                      CHOICE {
        explicitValue                       MAC-MainConfig,
        defaultValue                        NULL
    }                               OPTIONAL,                                -- Cond HO-
toEUTRA2
    sps-Config                          SPS-Config             OPTIONAL,    -- Need ON
    physicalConfigDedicated             PhysicalConfigDedicated OPTIONAL,   -- Need ON
    ...,
    [[  rlf-TimersAndConstants-r9       RLF-TimersAndConstants-r9          OPTIONAL   -- Need ON
    ]],
    [[  measSubframePatternPCell-r10    MeasSubframePatternPCell-r10       OPTIONAL   -- Need ON
    ]],
    [[  neighCellsCRS-Info-r11          NeighCellsCRS-Info-r11             OPTIONAL   -- Need ON
    ]]
    [[  NeighSmallCellsDS-Info-r12      NeighSmallCellsDS-Info-r12         OPTIONAL   -- Need ON
    ]]
}
RadioResourceConfigDedicatedSCell-r10 ::=   SEQUENCE {
    -- UE specific configuration extensions applicable for an SCell
    physicalConfigDedicatedSCell-r10        PhysicalConfigDedicatedSCell-r10   OPTIONAL,  -- Need ON
    ...,
    [[  mac-MainConfigSCell-r11             MAC-MainConfigSCell-r11            OPTIONAL   -- Cond SCellAdd
    ]]
}
SRB-ToAddModList ::=        SEQUENCE (SIZE (1..2)) OF SRB-ToAddMod
SRB-ToAddMod ::=    SEQUENCE {
    srb-Identity                        INTEGER (1..2),
    rlc-Config                          CHOICE {
        explicitValue                       RLC-Config,
```

```
            defaultValue                  NULL
        } OPTIONAL,                                                      -- Cond Setup
        logicalChannelConfig              CHOICE {
            explicitValue                 LogicalChannelConfig,
            defaultValue                  NULL
        } OPTIONAL,                                                      -- Cond Setup
        ...
    }
    DRB-ToAddModList ::=              SEQUENCE (SIZE (1..maxDRB)) OF DRB-ToAddMod
    DRB-ToAddMod ::=    SEQUENCE {
        eps-BearerIdentity            INTEGER (0..15)     OPTIONAL,      -- Cond DRB-Setup
        drb-Identity                  DRB-Identity,
        pdcp-Config                   PDCP-Config         OPTIONAL,      -- Cond PDCP
        rlc-Config                    RLC-Config          OPTIONAL,      -- Cond Setup
        logicalChannelIdentity        INTEGER (3..10)     OPTIONAL,      -- Cond DRB-Setup
        logicalChannelConfig          LogicalChannelConfig OPTIONAL,     -- Cond Setup
        ...
    }
    DRB-ToReleaseList ::=             SEQUENCE (SIZE (1..maxDRB)) OF DRB-Identity
    MeasSubframePatternPCell-r10 ::=  CHOICE {
        release                       NULL,
        setup                         MeasSubframePattern-r10
    }
    NeighCellsCRS-Info-r11 ::=    CHOICE {
        release                       NULL,
        setup                         CRS-AssistanceInfoList-r11
    }
    CRS-AssistanceInfoList-r11 ::=    SEQUENCE (SIZE (1..maxCellReport)) OF CRS-AssistanceInfo-r11
    CRS-AssistanceInfo-r11 ::= SEQUENCE {
        physCellId-r11                PhysCellId,
        antennaPortsCount-r11         ENUMERATED {an1, an2 , an4 , spare1},
        mbsfn-SubframeConfigList-r11  MBSFN-SubframeConfigList,
        ...
    }
    NeighSmallCellsDS-Info-r12 ::=    CHOICE {
        release                       NULL,
        setup                         DS-ConfigurationInfo-r12
    }
    DS-ConfigurationInfo-r12 ::=SEQUENCE {
        DS-TransmissionInterval-r12   ENUMERATED{
                                          sf20, sf40, sf80, sf160,sf320
                                          sf640},
        DS-SubframePattern-r12        BIT STRING (SIZE (40)),
        DS-FrequencyPattern-r12       BIT STRING (SIZE (dl-bandwidth)),
        DS-offset-r12                 ENUMERATED{
                                          10, 20, 40, 60, 80, 160, 320,480,640},
        ...
    }
    -- ASN1STOP
```

In the foregoing example, a DS-TransmissionInterval information element specifies the periodicity, a DS-SubframePattern information element specifies a subframe of a system frame in which the discovery signal is carried, a DS-FrequencyPattern information element specifies a carrier or frequency on which the discovery signal is carried, and a DS-Offset information element specifies the time offset (e.g. system frame number) of the discovery signal.

In some implementations, the macro eNB 104 or an active serving small cell eNB can send a mapping table (or other mapping data structure) to a UE. The mapping table maps cell identifiers with respective configurations of discovery signals. The mapping table can also be included in a dedicated or broadcast RRC message.

The configuration contained in the mapping table can include one or a combination of the following: the sequence of each discovery signal, and characteristic information (e.g. periodicity, time, and frequency) of the resource used to carry each discovery signal. When a UE detects a transmitted discovery signals, the UE can derive the cell identifier, using the mapping table, of the sleeping small cell eNB that transmitted the discovery signal. The UE can also determine the signal strength of the detected discovery signal. The UE can report feedback information (including the cell identifier and signal strength, for example) relating to the detected sleeping small cell eNB to the macro eNB 104, or to another active serving small cell eNB.

In response, a coordinating network node, such as the macro eNB 104, an active serving small cell eNB, or another network node, can send a command to awaken the sleeping small cell eNB to the on state, where the command can be sent on a backhaul link (e.g. 116 in FIG. 1), over the air, or over a link between the core network 118 and the sleeping small cell eNB.

To reduce the complexity of the sequence design associated with sending configuration information, the discovery sequences can be the same as sequences as synchronization signals (e.g. PSS/SSS) that are already sent by an active small cell eNB. However, the discovery sequences can have longer periods than the PSS/SSS sequences. A UE can distinguish a discovery sequence from a PSS/SSS sequence based on the periodicity of the detected sequence. In this manner, configuration information relating to the time and frequency resources of the discovery sequences that are the same as the configuration information of the PSS/SSS sequences would not have to be re-sent.

Alternatively, the macro eNB 104 or an active small cell eNB can send a list of sleeping small cell eNBs (but not with explicit discovery signal configuration), and the UE can determine the corresponding discovery signals based on the detected periodicity.

A coordinating network node, such as the macro eNB 104, an active small cell eNB, or another network node, can provide assistance information to set the periodicity of discovery signals, which can be based on a detected traffic load.

If the macro and small cell eNBs operate on different carriers, it can be assumed that no interference exists between the macro and small cell eNBs. However, if the macro and small cell eNBs operate on the same carrier, there may be interference between downlink transmissions of the macro eNB 104 and the downlink transmissions of discovery signals of the small cell eNBs. This may degrade the ability of a UE to detect a discovery signal transmitted by a sleeping small cell eNB.

To address the interference issue, examples of some solutions are described below.

In some examples, a UE can perform UE-side interference control, based on the UE's knowledge of the time and frequency resources used by small cell eNBs for transmitting discovery signals.

In alternative examples, the macro eNB 104 can mute downlink transmissions on the time and frequency resources that small cell eNBs use to transmit discovery signals.

Discovering a UE by a Sleeping Small Cell eNB

The foregoing describes implementations to allow a UE to detect sleeping small cell eNBs. The following describes implementations to allow a sleeping small cell eNB to detect a nearby UE (e.g. a UE that has entered a coverage area of the sleeping small cell eNB).

In some examples, a sleeping small cell eNB does not transmit any downlink signals including the discovery signals as discussed above. The sleeping small cell eNB can continue to monitor an uplink transmission from a UE. In response to detecting a nearby UE based on the detection of the UE's uplink transmission, the sleeping small cell eNB can perform a procedure to cause the sleeping small cell eNB to be awakened.

Figure 8:
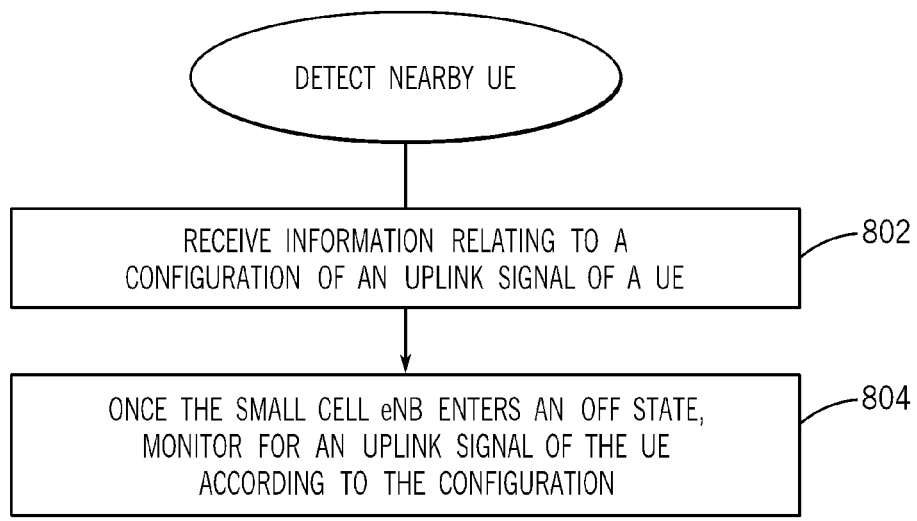
FIG. 8 is a flow diagram of a process of detecting a nearby user equipment by a sleeping wireless access network node, according to some implementations.

FIG. 8 illustrates an example process of detecting a nearby UE. The small cell eNB receives (at 802) information relating to a configuration of an uplink transmission of a UE to enable the wireless access network node to detect the uplink transmission. Once the small cell eNB has entered an off state, the sleeping small cell NB can monitor (at 804) for the uplink transmission of the UE according to the configuration.

In some implementations, the uplink transmission of a UE to be detected by a sleeping small cell eNB can be an existing uplink signal. In such implementations, the macro eNB 104 or other coordinating network node can transfer configuration information to a small cell eNB to enable the detection of a UE. The existing uplink signal can include a signal transmitted in a Physical Random Access Channel (PRACH). The PRACH signal is normally used by the UE to perform a random access procedure to establish a connection with an eNB (e.g. macro eNB 104 or a small cell eNB). Alternatively, the existing uplink signal that can be monitored by a sleeping small cell eNB can be a sounding reference signal (SRS), which is normally monitored by an eNB for determining an uplink channel quality. In other examples, other existing uplink signals can be monitored by a sleeping small cell eNB.

In examples where a sleeping small cell eNB is to monitor for an SRS of a UE, the macro eNB 104 or other coordinating network node can notify the small cell eNB of the SRS configuration, such as over the backhaul link. Using the SRS configuration, the sleeping small cell eNB can monitor for the SRS transmission to determine if there is a nearby UE. In such examples, synchronization may have to be maintained between the macro eNB 104 and the sleeping small cell eNB.

In other examples where a sleeping small cell eNB is to monitor for a PRACH transmission from a UE, the macro eNB 104 can send configuration information pertaining to the PRACH to the small cell eNB. Such configuration information can include the PRACH preamble and configuration (e.g. subframe number and frequency resource) for the PRACH.

A sleeping small cell eNB can then use the PRACH configuration to monitor for a PRACH. It may be difficult for a sleeping small cell eNB to determine which UE transmitted a PRACH, since a UE may randomly select a PRACH to transmit. However, the sleeping small cell eNB may not have to be aware of the identity of the nearby UE. The sleeping small cell eNB may simply make a determination that any UE is nearby.

Thus, when a PRACH is detected, the sleeping small cell eNB can send the detected PRACH, which is identified by a preamble number, subframe number, and frequency resource where the preamble was detected, and the associated receive power (or the power difference between the received and the target power in the small cell), to a coordinating network node, such as the macro eNB 104, an active small cell eNB, or another network node. The macro eNB 104 may compare the received power for the PRACH from multiple sleeping small cell eNBs as well as the preamble power level detected by the macro eNB 104 (or a threshold), and can determine whether the UE is nearby to one of the multiple sleeping small cell eNBs. The threshold may be the PRACH initial target received power configured in the macro cell plus some margin, which can be proportional to the ratio of output power of the macro and the small cell eNBs.

Figure 9:
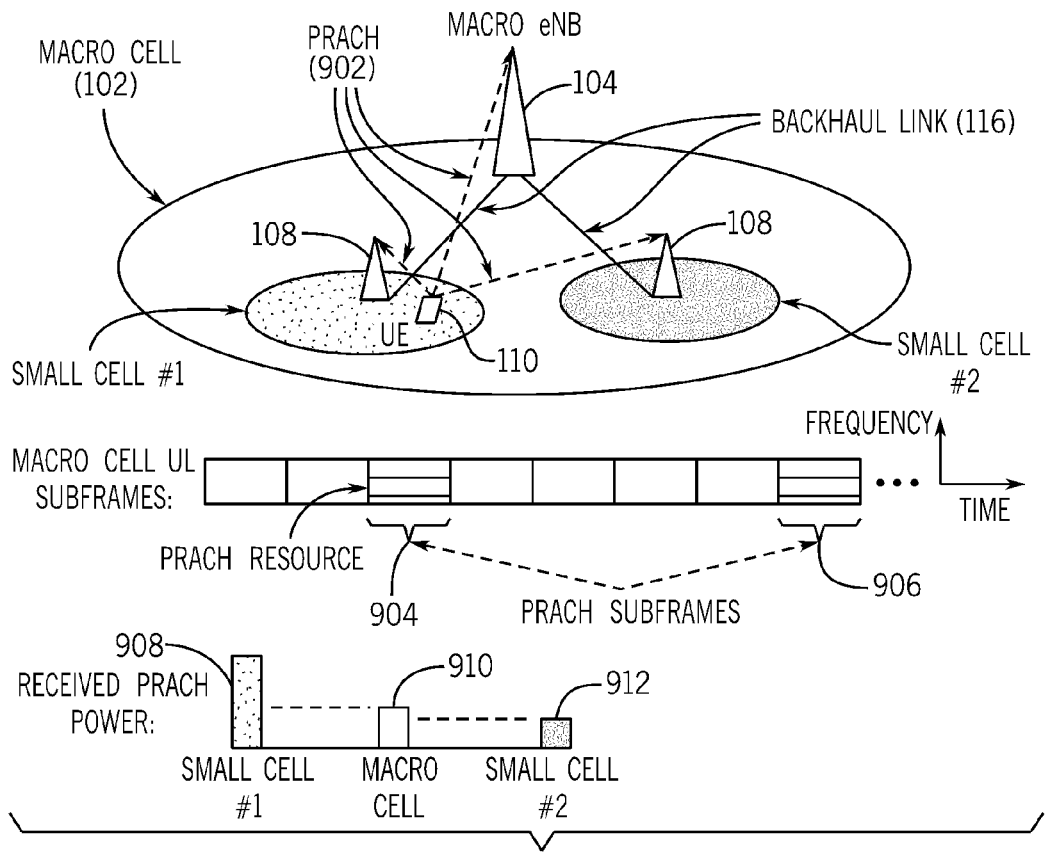
FIG. 9 is a schematic diagram of detecting a random access signal transmitted by a user equipment, according to further implementations.

An example is shown in FIG. 9, where the UE 110 that is nearby small cell #1 transmits PRACH (902) to the macro eNB 104 using the PRACH configuration of the macro cell 102. The PRACH configuration is signaled by the macro eNB 104 to the two small cell eNBs 108 over backhaul links 116. The PRACH configuration can specify subframes (904, 906) and the frequency on which the PRACH (902) is to be transmitted.

The small cell eNBs 108 can monitor for PRACH in the subframes (904, 906). Once detected, the small cell eNBs 108 can report information pertaining to the detected PRACH to the macro eNB 104 over respective backhaul links. Because the UE is closer to small cell #1, the detected PRACH power (908) in small cell #1 is higher than the detected PRACH power (910) in the macro cell 102 and the detected PRACH power (912) in small cell #2. Based on a comparison of the detected PRACH power levels (910, 912, and 914), the macro eNB 104 determines that the detected PRACH power level 910 is highest at small cell #1. As a result, the macro eNB 104 can inform the small cell eNB 108 of small cell #1 about the presence of the UE 110.

In alternative solutions, instead of monitoring for existing uplink signals from a UE, a sleeping small cell eNB can monitor for a new uplink signal. In some examples, the new uplink signal can be derived from an uplink sequence for the purpose of carrying additional information. There can be multiple different uplink sequences, and each sequence can carry different information.

Figure 10:
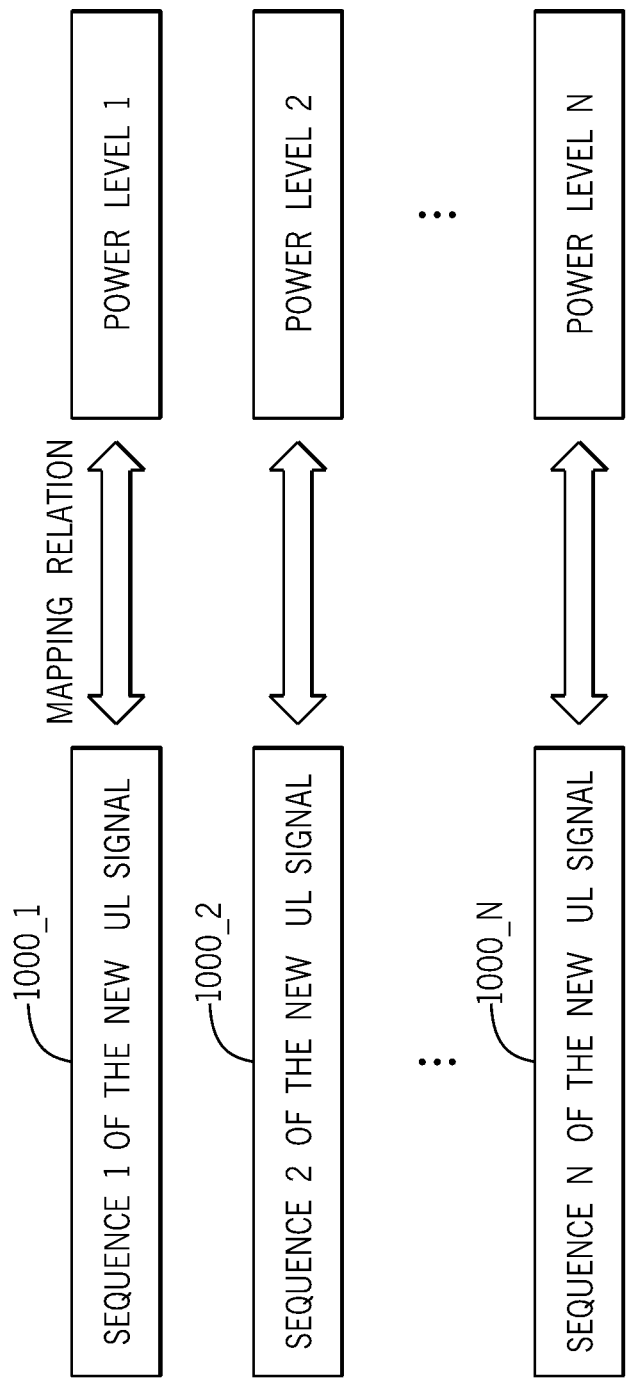
FIG. 10 illustrates mapping between uplink sequences and power levels, according to alternative implementations.

In some examples, as shown in FIG. 10, different uplink sequences 1000_1, 1000_2, . . . , 1000_N (where N>1) can be mapped to different respective power levels (1 to N). The power level information can be implicitly indicated by the uplink sequence.

Meanwhile, the resource to carry the uplink sequence can be informed to UEs by dedicated or broadcast RRC messages. The UEs could transmit the selected uplink sequence on the informed resource.

For example, the macro eNB 104 can send a mapping table (or other mapping data structure) that maps between uplink sequences and respective power levels, to a UE, using dedicated or broadcast RRC messaging. Then, when the UE is configured to send this new uplink signal, the UE can select the uplink sequence that reflects the power level of uplink transmissions of the UE. A sleeping small cell eNB can determine the power level of the UE based on the detected uplink sequence, and can then calculate the pathloss to the UE and decide if the sleeping small cell eNB should be activated.

More generally, the decision to determine whether to awaken the sleeping small cell eNB can be based on at least one of a power level of a detected uplink signal, a target received power at the sleeping small cell eNB, a maximum transmit power configured at the sleeping small cell eNB, a received power at a small cell eNB serving the UE, a maximum transmit power configured at the small cell eNB serving the UE.

In further examples in which a UE does not currently have any serving cell and is attempting to find a serving cell to provide services, the UE can transmit a new uplink signal, which may be known to the UE even if the UE is not currently attached to any serving cell. When a sleeping small cell eNB detects the uplink signal, the sleeping small cell eNB can determine that there is a nearby UE to be served. In this case, the small cell eNB may not have to derive the power level from the detected uplink signal initiate a procedure to cause activation of the sleeping small cell eNB in response to detecting the uplink signal to serve the UE.

In further examples, the macro eNB 104 can assist the sleeping small cell eNB in locating a UE. For example, if the small cell eNB's location information is known by the macro eNB 104 in advance, and the macro eNB 104 can obtain an estimated location of a the UE (such as based on feedback information or based on a positioning technique such as an observed time difference of arrival or OTDOA technique), then the macro eNB 104 can determine if a UE is nearby the small cell eNB. Alternatively, the macro eNB 104 can estimate the downlink pathloss to the UE based on the macro eNB's transmit power and feedback information (e.g. a measured Reference Signal Received Power or RSRP) from the UE. The downlink pathloss can be used by the macro eNB 104 to infer an uplink pathloss from the UE, in scenarios where the uplink and downlink channels are reciprocal, such as when TDD is used. From the downlink pathloss, the macro eNB 104 can estimate the location of the UE. Once the location of the UE is estimated, the macro eNB 104 can inform the sleeping small cell eNB of the UE's location.

In yet another alternative example, as the UE can be served by another active small cell eNB, the other active small cell eNB can adjusts the UE's uplink transmit power so that the arrival power at the active small cell eNB is approximately at a target power level. The sleeping small cell eNB can check the received power from the UE and determine if the received power is above or lower than the target power level. If the received power is above the target power level, that means the UE is closer to the sleeping small cell eNB.

In general, multiple sleeping small cell eNBs can measure the uplink transmit power from a UE, and the network (either a macro eNB or a head of a small cell cluster) can collect such measured power and compare the measured uplink transmit powers. The small cell eNB that with the largest received power can be considered as the one that is closest to the UE.

Transitioning a Small Cell eNB Between an On State and an Off State

The following describes implementations that can be employed to transition a small cell eNB from an on state to an off state with reduced impact on UEs within a coverage of the small cell eNB. Note that turning off a small cell eNB abruptly can cause interruption of data communications of UEs served by the small cell eNB, or of the communication of paging messages to UEs camped on the small cell eNB.

In accordance with some implementations, instead of turning off a given small cell eNB abruptly, the given small cell eNB can be gradually turned off. For example, the transmit power of the given small cell eNB can be gradually decreased to gradually shrink the coverage area of the given small cell eNB. This would allow UEs currently camped on the given small cell eNB to select other small cells. Also, reducing the transmit power would discourage UEs from camping on the given small cell eNB. The given small cell eNB can be turned off once the minimum transmit power is reached.

As discussed below, one or more timers can be used to control the gradual turnoff of a small cell eNB.

In the following, a small cell eNB can have several different off states, including a semi-off state (in which the transmit power of the small cell eNB is reduced), an off state (in which the small cell eNB can transmit minimal signaling, such as discovery signals, but does not transmit other signals), and a deep-off state (in which the small cell eNB does not transmit any signals and also not monitor the UE uplink transmission).

Figure 11:
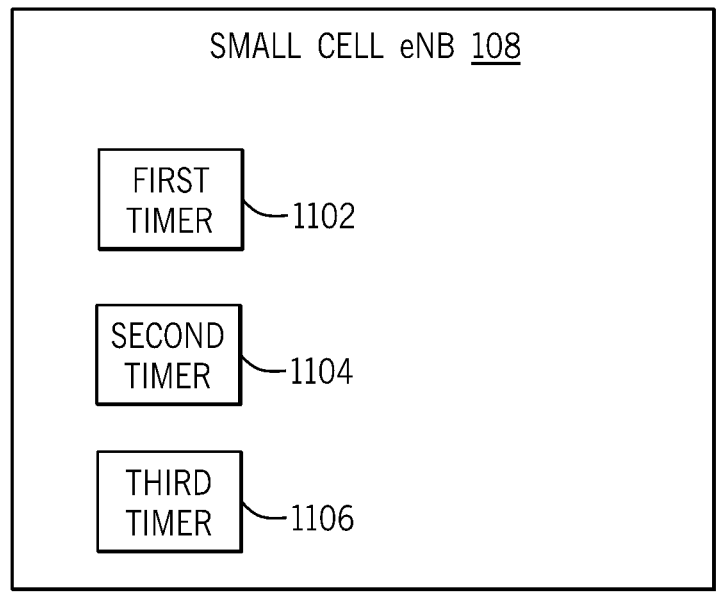
FIG. 11 is a block diagram of a small cell wireless access network node that includes various timers for controlling states of the small cell wireless access network node, according to further implementations.

As shown in FIG. 11, a first timer 1102 in the small cell eNB can be used for moving the small cell eNB from an on state to a semi-off state. The first timer 1102 is started when the small cell eNB determines that it does not have to serve any UEs anymore. This can occur as a result of (1) a mobility procedure in which the last UE previously served by the small cell eNB has been handed over to another cell; or (2) the last UE has moved from a connected state to an idle state.

Once the first timer 1102 expires, the small cell eNB can transition from the on state to the semi-off state. While in the semi-off state, the small cell eNB can gradually reduce its transmit power to shrink its coverage area. For example, the small cell eNB can transmit the following signals with reduced power: PSS, SSS, Physical Broadcast Channel (PBCH), CRS, SIB type 1, SIB type 2, and so forth. A UE closer to a small cell eNB is able to detect and perform a random access procedure (on PRACH) with the small cell eNB in the semi-off state.

Alternatively the small cell eNB can adjust parameters in the SIBs to discourage UEs from camping on it. In an example, the small cell eNB can increase one or both of a q-QualMin parameter and a q-RxLevMin parameter (as defined by 3GPP standards) for cell selection. In another example, the small cell eNB can increase one or both of an s-IntraSearchP parameter and an s-IntraSearchQ parameter (as defined by 3GPP standards) for cell reselection. In another example, the small cell eNB can select a lower value for a q-Hyst (as defined by 3GPP standards) parameter for intra-frequency cell (re)selection.

While in the semi-off state, the small cell eNB can continue to send paging messages to UEs served by the small cell eNB. Since the small cell is at a reduced activity level in the semi-off state, the small cell eNB can modify paging-related parameters in SIB type 2 to reduce the number of occasions that the small cell eNB schedules potential paging messages. For example, the small cell eNB can assign a defaultPagingCycle T to 256 radio frames (i.e. highest value as specified by current 3GPP standards), and a parameter nB to $\frac{1}{32}$T (i.e. lowest value as specified by current 3GPP standards).

Since the transmit power level is reduced in the semi-off state, the range reachable by a paging signal is reduced, thus reducing the number of UEs that are capable of receiving paging messages from the semi-off small cell eNB.

A second timer 1104 can be used to move the small cell eNB from a semi-off state to an off-state. The second timer 1104 is started in response to the small cell eNB transitioning to the semi-off state.

The second timer 1104 can be reset if the small cell eNB detects a new UE that is to be connected to the small cell eNB (in the semi-off state). This may be due to downlink data arrival from the macro eNB 104 or a core network node, or due to receipt of an uplink PRACH from a UE. The small cell eNB may even choose to transition out of the semi-off state back to the on state, in response to reset of the second timer 1104. When transitioning back to the on state, various operation parameters (such as the transmit power level, cell (re) selection parameters, paging parameters, etc.) that are provided in SIBs can be restored to normal operation levels.

In response to expiration of the second timer 1104, the small cell eNB can transition from the semi-off state to the off state. While in off state, the small cell eNB only transmits discovery signals, as discussed above. While a UE is able to detect the presence of a small cell eNB in an off state, the UE is not able to immediately perform a random access procedure with the small cell eNB in the off state.

In the off state, the small cell can transmit discovery signals using the normal transmission power such that the coverage area is not reduced.

In some examples, a third timer 1106 can be used to move the small cell eNB from a semi-off state or off state to a deep-off state. Depending on network setup, the third timer 1106 can be started in response to the small cell eNB transitioning to the semi-off state or off state. Note that the third timer 1106 can be used in place of or in addition to the second timer 1104.

The third timer 1106 can be reset if there is a new UE that is to be connected to the small cell eNB. This may be due to downlink data arrival from the macro eNB 104 or a core network node or uplink PRACH received at the small cell eNB. The small cell eNB may choose to transition to the on state in response to reset of the third timer 1106.

When the third timer 1106 expires, the small cell eNB can transition to the deep-off state. While in the deep-off state, the small cell eNB does not even transmit discovery signals and also not monitor the UE uplink transmission. However, the deep-off small cell eNB can still communicate over a backhaul link with another eNB.

In alternative examples, it is possible to start the third timer 1106 when the small cell eNB determines that it does not have to serve any UEs anymore. This can be due to (a) a mobility procedure where the last UE is handed over to another cell; or (b) the last UE having moved from the connected state to the idle state. In this case, upon expiration of the third timer 1106, the small cell eNB may move directly from the on state to the deep-off state. In such alternative examples, the third timer 1106 is used in place of the first and second timers 1102 and 1104 (in other words, the timers 1102 and 1104 may be omitted).

In general, according to some implementations, a wireless access network node includes a first timer that is started in response to an event. Upon expiration of the first timer, the wireless access network node transitions from a first power state to a second power state. In the second power state, the wireless access network node may gradually shrink its coverage area for instance by reducing the wireless access network node's transmit power.

The wireless access network node further includes a second timer that is started in response to the wireless access network node transitioning to the second power state. Upon expiration of the second timer, the wireless access network node transitions from the second power state to a third power state.

In the third power state, the wireless access network node transmits a discovery signal but does not transmit data and other control signals.

The wireless access network node further includes a third timer that is started in response to an event which can be the wireless access network node transitioning to the second or third power states. Upon expiration of the third timer, the wireless access network node transitions to a fourth power state. In the fourth power state, the wireless access network node does not transmit any signals.

Awaking a Small Cell eNB from an Off State

When a small cell eNB is in a deep-off state, the small cell eNB does not transmit any signals including discovery signals, and the small cell eNB is unable to monitor for uplink transmissions of UEs. In accordance with some implementations, techniques or mechanisms are provided to awaken a small cell eNB from a deep-off state or other off state.

A sleeping small cell eNB (that is in a deep-off or off state) can be awakened in response to a wake command sent over the backhaul link 116, over the air, or over another link. Upon receiving the wake command, the sleeping small cell eNB can transition to a semi-off state or on state. The state that the sleeping small cell eNB should move to can be identified in the wake command.

The wake command can be transmitted from one of the active small cell eNBs (in the on state), or from another coordinating network node such as the macro eNB 104. There can be several ways in which the coordinating network node can determine if a sleeping small-cell eNB should be awakened, and which of multiple deep-off small cell eNBs are to be awakened.

In some implementations, the determination of whether to awaken nearby sleeping small cell eNBs can be based on historical information, which can include fingerprint information collected during normal operation of the network. The fingerprint information can be used to identify a nearby sleeping small cell eNB to awaken. More specifically, during normal operation (such as when both small cell eNBs SC-1 and SC-2 are active), a UE (served by small cell eNB SC-2) can report back measurement information (e.g. a measurement vector), for each position of the UE, indicating the quality of channels between the UE and each of small cell eNBs SC-1 and SC-2 (and possibly other small-cell eNBs in the UE's range).

The reported measurement vector can change at different UE positions (the condition of each link depends on various factors including physical proximity of the UE to each eNB, fading coefficients, and environment obstacles). Based on the received measurement vectors, the serving small cell eNB SC-2 is able to monitor the quality of its link to its associated UE, and if the link quality is not acceptable, the serving small cell eNB SC-2 can determine at the channel condition between the UE and other small cell eNBs.

If appropriate (such as if the channel condition between the UE and another small cell eNB is better than the channel condition between the UE and the small cell eNB SC-2), handover of the UE to another small cell eNB (e.g. SC-1) can be performed. In the event of handover, the small cell eNB SC-2 can keep a record of the handover. For example, the small cell eNB SC-2 can store the corresponding measurement vector in a database and indicate that when a UE has such measurement vector (vector V_1), it has been handed over to a specific small cell eNB (e.g. SC-1). This database can be updated during network operation; therefore, the database can keep track of any structural modifications in the network.

The database can be used at the small cell eNB SC-2 to determine if the small cell eNB SC-2 should send a wake command to any neighboring sleeping small cell eNBs. Assume a network state in which the small cell eNB SC-1 is in an off state, and a UE is connected to the small cell eNB SC-2. Now assume that the UE changes its position, and after the change in position, the UE sends a measurement report (e.g. measurement vector discussed above) to the small cell eNB SC-2.

In response to receiving a measurement vector, the small cell eNB SC-2 can compare the measurement vector against the database maintained at the small cell eNB SC-2. At some point in time, assume that the reported measurement vector becomes closer to stored vector V_1 in the database, except for an entry of V_1 related to SC-1 (since SC-1 is sleeping, UE-1 does not have any measurement for SC-1). If that happens, since previously at this position, UE was handed over to SC-1 from SC-2, the small cell eNB SC-2 may decide to awaken the small cell eNB SC-1 from the off state to the semi-off or on state, such that the small cell small cell eNB SC-1 transmits discovery signals, so that the UE can also measure and report the channel condition between the UE and SC-1. Other factors (e.g. loading of the serving small cell eNB SC-2) can also be used to decide if the small cell eNB SC-2 should send out a wake command to its neighboring sleeping small cell eNBs.

Given the full measurement vector, the small cell eNB SC-2 can then decide whether the small cell eNB SC-2 should hand over the UE to the small cell eNB SC-1.

The small cell eNB SC-1 that was awakened to the on or semi-off state can wait for signaling from the UE. If the small cell eNB SC-1 does not receive an uplink transmission from the UE within a specified time period, the small cell eNB SC-1 can turn itself back to an off state.

Using techniques according to some implementations, the small cell eNB SC-2, can determine whether or not to awaken a neighboring sleeping small cell eNB without assistance from the macro eNB 104 (or other coordinating node).

In further implementations, if there is a macro eNB 104 (or other coordinating node) that can help determine UE locations or potential neighboring small cell eNBs to awaken, the small cell eNB SC-2 can also use such information from the macro eNB 104 or other coordinating node. Any other rough estimation of a UE's location can also help to improve the performance of deciding which neighboring sleeping small cell eNB to awaken.

In general, according to some implementations, a wireless access network node collects information about network operation. The wireless access network node can use the collected information about network operation to decide whether or not to awaken a sleeping wireless access network node. A wake command is then sent to the sleeping wireless access network node on a backhaul link.

The collected information can include information pertaining to handovers of a UE, positions of the UE, and UE measurements.

When a small cell eNB is awakened, the small cell eNB can wait for a period of time and if the small cell eNB sees no new UE association during the period, the small cell eNB can again start a sleeping procedure to transition to an off state.

Dynamic Power Control of a Small Cell eNB

In some implementations, a small cell eNB can be turned on and off in a dynamic manner. For example, the small cell eNB can be turned on or off on a subframe-by-subframe basis, e.g. the small cell eNB can be turned on in a first subframe (or first group of subframes) and turned off in a second subframe (or second group of subframes) within a given system frame.

The small cell eNB can dynamically turn on/off its transmission based on the traffic or interference condition in the network. For example, if the small cell eNB has a UE to serve in a given subframe, the small cell eNB will transmit data and/or control information in the given subframe to the UE. If the small cell eNB has no UE to serve in another subframe, then the small cell eNB can decide not to transmit data and control information in the other subframe. For example, the small cell eNB can decide not to send a CRS or Channel State Information (CSI) reference signal (CSI-RS) in the other subframe.

Implementing a dynamic small cell eNB on/off scheme may cause unwanted interference. For example, when a UE is close to a small cell eNB, the small cell eNB may still transmit reference signals (such as CRS) at full power to serve the UE, which may cause interference in neighboring cells.

To mitigate such interference, a dynamic power control technique can be applied. With the dynamic power control technique, the small cell eNB can dynamically control its transmit power on a subframe-by-subframe basis, even for transmitting CRS. For example, if a UE close to the small cell eNB is to be served in a first subframe, the small cell eNB can transmit content in the first subframe at lower power level. If a UE farther away from the small cell eNB is to be served in a second subframe, the small cell eNB can transmit to the UE at higher power level.

It is noted that dynamic small cell on/off can be considered a special case of dynamic power control of a small cell eNB, because when the transmit power from the small cell eNB is completely turned off, it is equivalent to dynamic small cell on/off.

In some implementations, the power levels of transmissions including CRS and other control signaling can be reduced in some subframes depending on distribution of UEs that are to be served. A power level of a transmission can be determined based on feedback from a UE, where the feedback can include RSRP, Reference Signal Received Quality (RSRQ), and Channel Quality Indication (CQI). For example, if the small cell eNB has to schedule transmission in a given subframe only to a particular UE, the small cell eNB can adjust the transmission power level for the given subframe based on the feedback from the particular UE. If there multiple UEs to be served in the given subframe, the transmission power can be determined based on the combined feedback from the multiple UEs.

Since a small cell eNB may not serve as many UEs as the macro eNB 104 in a given subframe, adjusting transmission power based on feedback from the UEs served by the small cell eNB can be feasible. In general, the principle is that the small cell eNB can serve UEs using a reduced amount of downlink transmission power (to reduce interference), while ensuring that the UEs can successfully receive information in each given subframe. When there is no traffic scheduled in a given subframe, the small cell eNB can turn off its transceiver.

To support the ability to adjust transmission power on a subframe-by-subframe basis, the following are considered. A first issue relates to measurements, such as Radio Resource Management (RRM) or Radio Link Monitoring (RLM) measurements. Another issue relates to Channel State Information (CSI) feedback.

Figure 12:
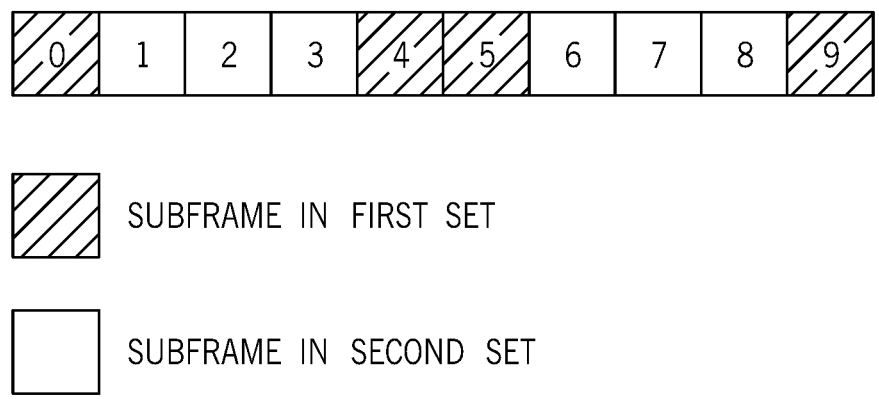
FIG. 12 is a schematic diagram of a collection of subframes that is divided into first and second sets of subframes, according to further implementations.

According to E-UTRA, measurements such as RRM and RLM measurements rely on CRS, which is shared among multiple UEs. If the transmission power of CRS changes from time to time, the RRM or RLM measurements may be impacted. To resolve the impact on the measurements, the subframes can be divided into two sets, as depicted in FIG. 12. The two sets include a first set of subframes (hashed pattern boxes) and a second set of subframes (blank boxes).

In the first set of subframes, the small cell eNB can transmit normally using the power levels specified in current standards, and the power levels do not change rapidly over time. The first set of subframes can also be used to transmit some common control information such as synchronization signals (e.g. PSS/SSS), CRS, system information, and paging information. The UE can perform RRM and RLM measurements in these subframes. The CSI can be calculated in this first set of subframes as well. Other operations, such as synchronization and synchronization tracking, can also be performed using the first set of subframes. To handle interference between small cells in the first set of subframes, one of several solutions can be implemented.

A first solution is based on scheduling by the small cell eNB. The small cell eNB can only schedule UEs that experience less interference, e.g. UEs closer to the center of the small cell, as determined from measurement information from UEs.

A second solution is based on coordinated transmission by small cell eNBs. Small cell eNBs can coordinate their transmissions to reduce mutual interference. For example, the small cell eNBs can coordinate the frequency resources used in the first set of subframes. The coordinating can be performed based on communications over backhaul links between the small cell eNBs.

In the second set of subframes, a small cell eNB can perform dynamic power control on a subframe-by-subframe basis (as discussed further above). Legacy reference signals and control signals, such as CRS, Physical Control Format indicator Channel (PCFICH), Physical channel Hybrid ARQ indicator Channel (PHICH), and Physical Downlink Control Channel (PDCCH) may not be transmitted in the second set of subframes.

Backward compatibility issues may not appears if the dynamic power control is only applied in the secondary cells. A small cell eNB that supports carrier aggregation can communicate over multiple component carriers of the carrier aggregation. One of the component carriers is configured as a primary cell while the remaining component carrier(s) is (are) configured as secondary cell(s). The primary cell is used to communicate certain control information to UEs served by the primary cell.

Legacy UEs (those that do not support a carrier of a new carrier type or NCT) can be served in backward compatible cells only. A new carrier type (NCT) refers to a carrier that is of a type different from a legacy carrier, where the new carrier type can be implemented to provide for enhanced features, including enhanced spectral efficiency, improved energy efficiency, improved support for heterogeneous networks, and so forth. A cell provided by a legacy carrier can be referred to as a backward compatible cell. A cell provided by an NCT carrier can be an NCT cell.

In a backward compatible cell, the CSI-RS, demodulation reference signal (DMRS), or Enhanced Physical Downlink Control Channel (EPDCCH) can be used for the purpose of data demodulation and measurement.

Alternatively, Multicast-Broadcast Single Frequency Network (MBSFN) subframes can be used where CRS and PDCCH are only transmitted in the first several OFDM symbols, while the rest of the symbols are used for transmission of PDSCH using DMRS for demodulation. If the DMRS has the same transmission power as PDSCH, no extra signal has to be used to inform the UE even if dynamic power control is applied on PDSCH transmissions. The CRS transmission power level in a MBSFN subframe can also be dynamically adjusted to reduce interference to other cells. As the CRS in this case is used for PDCCH decoding only and Quadrature Phase Shift Keying (QPSK) is used for PDCCH transmissions, the power level of CRS does not have to be signaled to the UE.

To maintain the same interference level for RRM and RLM measurements, different small cell eNBs can use the same first set of subframes, where the CRS and other control signals are all transmitted at normal power level. Thus, the RRM and RLM measurements can be accomplished in the first set subframes. For CSI measurement and feedback, it can also be configured and measured in the first set of subframes using CRS or CSI-RS because the transmit power levels of these signals are constant. The CSI measurement can be conducted in the second set of subframes. However, since the transmit signal power level including CSI-RS can vary from subframe to subframe, such CSI measurement may not be accurate.

The configuration of the two sets of subframes can be provided to UEs in dedicated or broadcast RRC messages.

In general, according to some implementations, a wireless access network node performs communications in a plurality of sets of subframes. In a first set of subframes, the wireless access network node performs dynamic power control. In a second set of subframes, the wireless access network node does not perform dynamic power control.

The dynamic power control includes reducing a power level of a control signal on a subframe-by-subframe basis.

Reducing the power level of a transmission in a given subframe includes turning off the wireless access network node in the given subframe.

The configuration of the two sets of subframes can be provided to UEs in dedicated or broadcast RRC messages.

System Architecture

Figure 13:
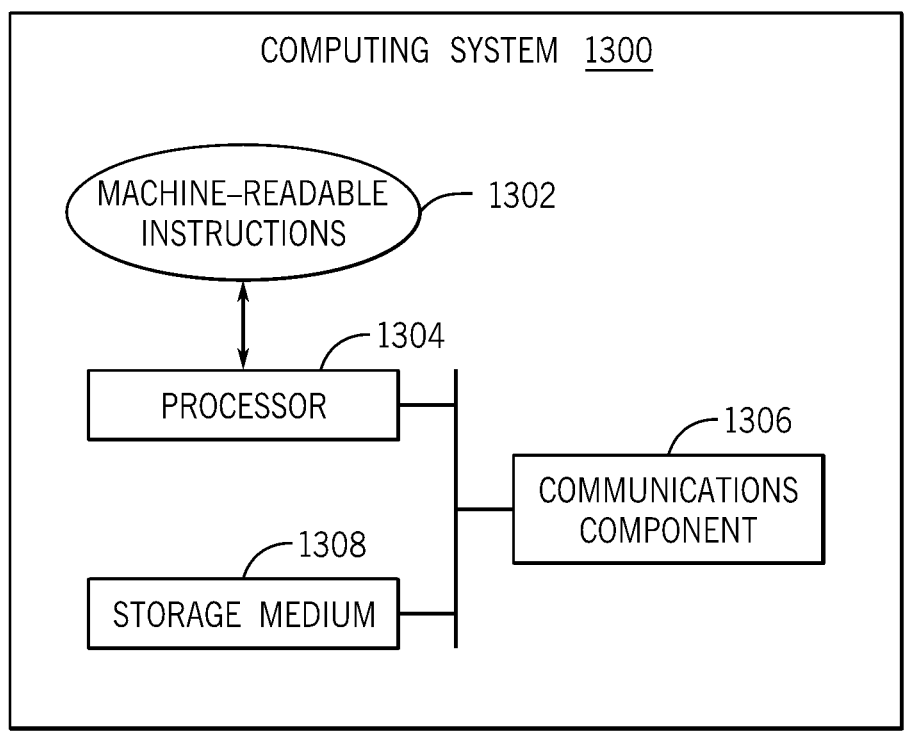
FIG. 13 is a block diagram of a computing system according to some implementations.

FIG. 13 depicts a computing system 1300, which can be any of the macro eNB 104, small cell eNB 108, or other network node discussed above. The computing system 1300 includes machine-readable instructions 1302, which are executable on a processor (or multiple processors) 1304 to perform various tasks discussed above. A processor can include a microprocessor, microcontroller, processor module or subsystem, programmable integrated circuit, programmable gate array, or another control or computing device.

The processor(s) 1304 can be coupled to a communication interface (or communication component) 1306 to perform communications. For example, the communication interface 1306 can perform wireless communication over an air interface, or perform wired communication over a wired connection. In some cases, the computing system 1300 can include multiple communication interfaces 1306 to communicate with respective different network nodes.

The processor(s) 1304 can also be coupled to a computer-readable or machine-readable storage medium (or storage media) 1308, for storing data and instructions. The storage medium or storage media 1608 can include one or multiple computer-readable or machine-readable storage media. The storage media include different forms of memory including semiconductor memory devices such as dynamic or static random access memories (DRAMs or SRAMs), erasable and programmable read-only memories (EPROMs), electrically erasable and programmable read-only memories (EEPROMs) and flash memories; magnetic disks such as fixed, floppy and removable disks; other magnetic media including tape; optical media such as compact disks (CDs) or digital video disks (DVDs); or other types of storage devices. Note that the instructions discussed above can be provided on one computer-readable or machine-readable storage medium, or alternatively, can be provided on multiple computer-readable or machine-readable storage media distributed in a large system having possibly plural nodes. Such computer-readable or machine-readable storage medium or media is (are) considered to be part of an article (or article of manufacture). An article or article of manufacture can refer to any manufactured single component or multiple components. The storage medium or media can be located either in the machine running the machine-readable instructions, or located at a remote site from which machine-readable instructions can be downloaded over a network for execution.

In the foregoing description, numerous details are set forth to provide an understanding of the subject disclosed herein. However, implementations may be practiced without some of these details. Other implementations may include modifications and variations from the details discussed above. It is intended that the appended claims cover such modifications and variations.

What is claimed is:

1. A method comprising:
   receiving, by a user equipment (UE), information relating to a configuration for a discovery signal for transmission by a first wireless access network node when the first wireless access network node is in an off state;
   receiving, by the UE from the first wireless access network node that is in the off state, the discovery signal according to the configuration; and
   detecting, by the UE based on the received discovery signal, the first wireless access network node that is in the off state, wherein detecting, by the UE, the wireless access network node that is in the off state comprises determining, by the UE, a cell identifier of the first wireless access network node that is in the off state.

2. The method of claim 1, further comprising:
   sending, by the UE to a second wireless access network node, feedback information relating to the received discovery signal, the feedback information causing the second wireless access network node to send an indication to activate the first wireless access network node from the off state to an on state.

3. The method of claim 1, wherein receiving the information relating to the configuration comprises receiving timing information for the discovery signal.

4. The method of claim 1, wherein the configuration includes a signal configuration for the discovery signal, the signal configuration specifying that the discovery signal is a cell-specific signal.

5. The method of claim 4, wherein the cell-specific signal is a signal selected from among a cell-specific reference signal having an increased periodicity, and a synchronization signal having an increased periodicity.

6. The method of claim 1, wherein the configuration includes a configuration relating to one or both a time resource and a frequency resource for carrying the discovery signal.

7. The method of claim 1, wherein the information relating to the configuration is received by the UE in a dedicated or broadcast message.

8. The method of claim 1, wherein the discovery signal is derived from a sequence that is unique to the first wireless access network node.

9. The method of claim 8, wherein the sequence is orthogonal or quasi-orthogonal with respect to a sequence of a discovery signal transmitted by another neighboring wireless access network node.

10. The method of claim 8, wherein the sequence is based on a cell identifier of a cell associated with the first wireless access network node.

11. The method of claim 1, wherein one or both of a sequence and resource of the discovery signal indicates a duplex mode of the first wireless access network node.

12. The method of claim 1, wherein the discovery signal transmitted by the first wireless access network node has a same periodicity and is transmitted in a same resource as a discovery signal transmitted by another wireless access network node that is in an off state, wherein the resource is one or more of a time resource, a frequency resource, and a sequence resource.

13. The method of claim 1, wherein the discovery signal transmitted by the first wireless access network node is carried in a different resource than a resource carrying a discovery signal transmitted by another wireless access network node that is in an off state, wherein the different resource is one or more of a time resource, a frequency resource, and a sequence resource.

14. A user equipment (UE) comprising:
   at least one processor configured to:
      receive a Radio Resource Control (RRC) message containing timing information pertaining to a discovery signal to be transmitted by a first wireless access network node in an off state;
      receive, from the first wireless access network node that is in the off state, the discovery signal according to the timing information; and
      detect, based on the received discovery signal, the first wireless access network node that is in the off state, the detecting comprising determining a cell identifier of the first wireless access network node that is in the off state.

15. The UE of claim 14, wherein the timing information includes one or more of a periodicity of the discovery signal and an offset of the discovery signal.

16. The UE of claim 14, wherein a periodicity of the discovery signal is dynamically set and is sent by a second wireless access network node to the first wireless access network node.

17. The UE of claim 14, wherein the RRC message further contains one or more of a time resource and a frequency resource for the discovery signal.

18. The UE of claim 14, wherein the at least one processor is configured to further send, to a second wireless access network node, feedback information relating to the received discovery signal, the feedback information causing the second wireless access network node to send an indication to activate the first wireless access network node from the off state to an on state.

* * * * *